(12) United States Patent
Hiyama et al.

(10) Patent No.: US 7,643,829 B2
(45) Date of Patent: Jan. 5, 2010

(54) LOCAL LOCATION MANAGER, HOME LOCATION MANAGER AND MOBILE COMMUNICATION SYSTEM

(75) Inventors: Satoshi Hiyama, Yokohama (JP); Toshihiro Suzuki, Yokohama (JP); Masashi Yamashita, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 11/646,231

(22) Filed: Dec. 28, 2006

(65) Prior Publication Data

US 2007/0105556 A1 May 10, 2007

Related U.S. Application Data

(63) Continuation of application No. 10/760,717, filed on Jan. 21, 2004, now abandoned.

(30) Foreign Application Priority Data

Jan. 24, 2003 (JP) ............................. 2003-016183

(51) Int. Cl.
*H04W 4/00* (2009.01)
(52) U.S. Cl. ................ 455/435.1; 455/436; 455/432.1; 455/433; 455/445; 701/207; 701/210
(58) Field of Classification Search ............. 455/456.1, 455/435.1, 445, 436, 433, 432.1; 701/207, 701/210
See application file for complete search history.

(56) References Cited

U.S. PATENT DOCUMENTS

| | | | |
|---|---|---|---|
| 5,825,759 A | | 10/1998 | Liu |
| 5,839,072 A | * | 11/1998 | Chien .......................... 455/445 |
| 6,272,344 B1 | * | 8/2001 | Kojima ..................... 455/435.1 |
| 7,113,784 B2 | | 9/2006 | Fujiwara et al. |

| | | | |
|---|---|---|---|
| 2001/0019545 A1 | * | 9/2001 | Okubo et al. ............... 370/331 |

(Continued)

FOREIGN PATENT DOCUMENTS

EP 1237389 9/2002

(Continued)

OTHER PUBLICATIONS

Japanese Office Action dated May 15, 2007.

(Continued)

*Primary Examiner*—Dwayne Bost
*Assistant Examiner*—Pierre-Louis Desir
(74) *Attorney, Agent, or Firm*—Crowell & Moring LLP

(57) ABSTRACT

Time required for location registration is reduced and concentration of location update signals caused when a group moves is prevented. Each mobile node and a mobile router sends a location update request to a local location manager near to the area in which it exists, so that time required for location registration can be reduced, and it is possible to prevent pressure on wireless resources and temporary increase in communication traffic within a mobile network, which may be caused by concentration of location update signals when a group moves as in the case of a train with a lot of passengers having mobile nodes. Thereby, even if location registration is not correctly performed by a mobile router, which sends a location update request on behalf of mobile nodes existing in the space of a moving body, due to the communication condition or a failure, it can be dealt with.

15 Claims, 15 Drawing Sheets

U.S. PATENT DOCUMENTS

2002/0018455 A1    2/2002  Yokoyama
2002/0138195 A1*   9/2002  Watanabe .................. 701/207
2003/0119502 A1*   6/2003  Yokota ....................... 455/433

FOREIGN PATENT DOCUMENTS

| JP | 9-327057 | 12/1997 |
|----|----------|---------|
| JP | 11355835 | 12/1999 |
| JP | 2002-305766 | 10/2002 |
| WO | WO 02/41659 A1 | 5/2002 |

OTHER PUBLICATIONS

Hideaki Yumiba et al., "A Study On Concatenated Mobility Management", Technical Report of IEICE, Feb. 2001, pp. 7-14, IN2000-177 (English Abstract).

* cited by examiner

LOCAL LOCATION MANAGER, HOME LOCATION MANAGER AND MOBILE COMMUNICATION SYSTEM

BACKGROUND OF THE INVENTION

1. Field of the Invention

The present invention relates to a local location manager, a home location manager and a mobile communication system, and in particular to a location management method in a local location manager, a home location manager and a mobile communication system.

2. Description of the Prior Art

As is well known, it is common in mobile communication services to store the location of each mobile node, such as a cellular telephone, in a location manager in order that the mobile node can receive an inquiry (incoming call/packet) wherever it is. Specifically, an area for which a mobile communication service is provided is divided in multiple registration areas, and when a mobile node moves from one registration area to another registration area, a location update request, in which a registration area after movement is identified, is sent from the moving node to the mobile network via a base-station apparatus, consuming wireless resources. In response to the location update request, the registration area of each mobile node, which is stored in the location manager is sequentially updated.

However, when there are a lot of passengers carrying a mobile node in a train, for example, a lot of mobile nodes move at the same time as the train moves, and if the train moves from one registration area across to another registration area (i.e. crossing the area), a location update request is sent to a mobile network from each of these mobile nodes via a base-station apparatus. This causes problems such as pressure on wireless resources and temporary, significant increase in communication traffic in the mobile network.

Techniques for solving these problems are disclosed in Patent Document 1 and Non-patent Document 1, for example. In these documents, a mobile communication system is disclosed in which a master-slave relationship is established between a moving body, such as a train, and a mobile node existing in the space of the moving body so that a mobile router installed in the moving body, which is a master, sends a location update request of the mobile nodes, which are slaves, to the mobile network on behalf of the mobile nodes, consuming wireless resources. In this mobile communication system, a mobile node existing in the space of a moving body registers its location with the above mobile router as a virtual base-station apparatus. When the moving body moves from one registration area to another registration area, the mobile router sends a location update request to the mobile network via a base-station apparatus. In this way, it is realized that the mobile router sends a location update request on behalf of mobile nodes existing in the space of a moving body.

(Patent Document 1)
Published Unexamined Patent Application No. 11-355835
(Non-Patent Document 1)
"A Study on Concatenated Mobility Management" by Yumiba, Sasada, Fujiwara and Yabusaki, IEICE Technical Report; IN2000-177, pp. 7-14; February 2001

PROBLEMS TO BE SOLVED BY THE INVENTION

However, in the mobile communication system disclosed in the above documents, a location manager (hereinafter referred to as LM for short) for managing the location area (hereinafter referred to as LA for short) of each mobile node (hereinafter referred to as MN for short) and a mobile router (hereinafter referred to as MR for short) is assigned fixedly, and a location update request (hereinafter referred to as LU for short) sent by each MN or MR is always received by the same LM, however long a distance the MN or MR moves for, or wherever the MN or MR is located. The mobile communication system will be now described, with reference to FIG. 16.

The mobile communication system shown in the figure is configured to include: a mobile router MR#1 performing an LU on behalf of MN's existing in the space of a moving body; mobile nodes MN#1 and MN#2, which do not perform an LU when they exist in the same space as the mobile router MR#1; location managers LM#1 and LM#2 storing LA information on the MN's and the MR, or information indicating a master-slave relationship between the mobile router and the mobile nodes (hereinafter referred to as master-slave information for short); and an access router (hereinafter referred to as AR for short) which signals an area identification (hereinafter referred to as ArI) to the mobile nodes and the mobile router and retains a correspondence relationship between the ArI and an area address (hereinafter referred to as ArA for short) managed as an LA within a network.

A large area is formed for location managers LM#1 and LM#2. Multiple AR's are included in this area. Each of location areas LA#A, LA#B, LA#C, LA#D, ..., LA#Z is a set of multiple areas each of which corresponds to each AR.

Though not specifically shown in the figure, there are generally provided a router or a switch for transferring a signal between AR and LM or between LM and LM.

In FIG. 16, it is registered with the LM#1 that the LA for a mobile node with an identification (ID) "MN#1" and a mobile node with an identification (ID) "MN#2" is "MR#1".

In this situation, if the mobile router MR#1 moves together with a moving body and the LA changes from "LA#A" to "LA#B", then the mobile router MR#1 is registered not with the nearest LM#1 but with the LM#2 which is fixedly assigned based on an identification (ID) such as a telephone number and an IP address (S60).

Therefore, if there is a long distance between each mobile node or the mobile router and an LM, with which each mobile node or the mobile router is to be registered, it causes a problem that time required for location registration is increased.

There is also known a mobile communication system comprising a local location manager (hereinafter referred to as LLM for short) for storing an LA in which a mobile node exists; and a home location manager (hereinafter referred to as HLM for short) for storing information on the LLM for the area in which a mobile node exists (hereinafter referred to as LLM information). The GSM (global system for mobile communications) and the IS-41 (interim standard-41) are examples of this mobile communication system. In such mobile communication systems, an LLM for each MN is not fixedly assigned, and each MN sends an LU to an LLM near to the area where it exists. This enables the time required for location registration to be reduced.

However, such a location management method, in which the mobile communication system disclosed in the above documents is not taken into consideration, cannot prevent pressure on wireless resources and temporary increase in communication traffic in a mobile network, which may be caused when movement of a group occurs as in the case of a train described above, cannot be prevented.

Furthermore, the mobile communication system disclosed in the above published unexamined patent application and the like has a problem that, if location registration is not correctly performed by the MR, which performs an LU of MN's existing in the space of the moving body on behalf of the MN's, due to the communication condition or a failure, it cannot be dealt with.

The present invention has been made in consideration of the above problems, and its object is to provide a local location manager, a home location manager and a mobile communication system in which each MN or MR sends an LU to an LLM nearest to the area where it exists, and thereby, time required for location registration can be reduced, and it is possible to prevent pressure on wireless resources and temporary increase in communication traffic within a mobile network, which may be caused by concentration of LU signals when a group moves as in the case of a train described above; and even if location registration is not correctly performed by a mobile router, which performs a location update request on behalf of mobile nodes existing in the space of a moving body, due to the communication condition or a failure, it can be dealt with.

BRIEF SUMMARY OF THE INVENTION

The local location manager according to claim 1 of the present invention is a local location manager for receiving registration of location information sent by a mobile router moving together with a group of mobile nodes in a master-slave relationship on behalf of the group; the location manager comprising: means for updating location information registered with the local location manager; means for sending a deletion request for deleting location information on the mobile router, which has requested registration of location information, to a different local location manager storing the location information on the mobile router; and means for sending an update request for updating local location manager information indicating a correspondence relationship of a mobile router and the mobile nodes with a local location manager.

Each mobile node and a mobile router sends a location update request to a local location manager nearest to the area where it exists, so that time required for location registration is reduced, and it is possible to prevent pressure on wireless resources and temporary increase in communication traffic within a mobile network, which may be caused by concentration of location update signals when a group moves as in the case of a train described above.

The local location manager according to claim 2 of the present invention is the local location manager according to claim 1; wherein the local location manager information is registered with a home location manager provided in association with multiple local location managers and a home location manger is identified based on identifications specific to the mobile router and the mobile nodes. By referring to an identification specific to a mobile router or a mobile node, a home location manager can be easily identified.

The local location manager according to claim 3 of the present invention is a local location manager comprising: means for, in response to receiving the deletion request for deleting location information to a different local location manager, notifying the different location manager of registered contents for the mobile nodes in a master-slave relationship with a mobile router registered with the local location manager itself; and means for deleting registered contents of location information and information indicating a master-slave relationship on the mobile router registered with the local location manager itself. This enables location information and information indicating a master-slave relationship to be certainly updated.

The local location manager according to claim 4 of the present invention is the local location manager according to any one of claims 1 to 3; wherein, when a master-slave relationship is newly generated between the mobile router and a mobile node, it is confirmed whether there is any difference between the location information on the mobile router and location information on the mobile node, and, if there is any difference, the location information on the mobile router is corrected and the master-slave relationship is registered. Thereby, even if location registration is not correctly performed by a mobile router, which performs an LU of mobile nodes existing in the space of a moving body on behalf of the mobile nodes, due to the communication condition or a failure, it can be dealt with.

The local location manager according to claim 5 of the present invention is the local location manager according to any one of claims 1 to 3; wherein, when the master-slave relationship between the mobile router and a mobile node is released, it is confirmed whether there is any difference between the location information on the mobile router and location information on the mobile node, and, if there is any difference, the location information on the mobile router is corrected and registration of the master-slave relationship is deleted. Thereby, even if location registration is not correctly performed by a mobile router, which performs an LU of mobile nodes existing in the space of a moving body on behalf of the mobile nodes, due to the communication condition or a failure, it can be dealt with.

The home location manager according to claim 6 of the present invention is a home location manager for managing local location manager information indicating a correspondence relationship of mobile nodes and a mobile router with a local location manager, with which location information on the mobile nodes and the mobile router are registered; the home location manager comprising: means for, in response to receiving an update request for updating the local location manager information from a local location manager in association with the home location manager itself, updating the local location manager information registered with the home location manager itself; and means for sending registered contents before update to the local location manager which has sent the update request. This enables location information and information indicating a master-slave relationship to be certainly updated.

The mobile communication system according to claim 7 of the present invention is a mobile communication system comprising: a first local location manager for receiving registration of location information from a mobile router moving together with a group of mobile nodes in a master-slave relationship on behalf of the group; and a home location manager for managing local location manager information indicating a correspondence relationship of the mobile nodes and the mobile router with the local location manager; wherein the first local location manager comprises: means for updating location information registered with the first local location manager itself; means for sending a deletion request for deleting location information on the mobile router, which has requested registration of location information, to a different location manager storing the location information on the mobile router; and means for sending an update request for updating local location manager information indicating a correspondence relationship of the mobile router and the mobile nodes with the local location manager; and the home location manager comprises: means for, in response to receiving an update request for updating the local location manager information from a local location manager in association with the home location manager itself, updating the local location manager information registered with the home location manager itself; and means for sending registered contents before update to the first local location manager which has sent the update request.

Each mobile node and mobile router sends a location update request to a local location manager nearest to the area where it exists, so that time required for location registration is reduced, and it is possible to prevent pressure on wireless resources and temporary increase in communication traffic within a mobile network, which may be caused by concentration of location update signals when a group moves as in the case of a train described above.

The mobile communication system according to claim 8 of the present invention is the mobile communication system according to claim 7; wherein the local location manager information is registered with a home location manager provided in association with multiple local location managers and a home location manager is identified based on identifications specific to the mobile router and the mobile nodes. By referring to an identification specific to a mobile router or a mobile node, a home location manager can be easily identified.

The mobile communication system according to claim 9 of the present invention is the mobile communication system according to claim 7 or 8; the mobile communication system further comprising a second local location manager comprising: means for, in response to receiving the deletion request for deleting location information to a different local location manager, notifying the different location manager of registered contents for the mobile nodes in a master-slave relationship with a mobile router registered with the second local location manager itself; and means for deleting registered contents of location information and information indicating a master-slave relationship on the mobile router registered with the second local location manager itself. This enables location information and information indicating a master-slave relationship to be certainly updated.

The mobile communication system according to claim 10 of the present invention is the mobile communication system according to any one of claims 7 to 9; wherein, when a master-slave relationship is newly generated between the mobile router and a mobile node, the first local location manager confirms whether there is any difference between the location information on the mobile router and location information on the mobile node, and, if there is any difference, corrects the location information on the mobile router and registers the master-slave relationship. Thereby, even if location registration is not correctly performed by a mobile router, which performs an LU of mobile nodes existing in the space of a moving body on behalf of the mobile nodes, due to the communication condition or a failure, it can be dealt with.

The mobile communication system according to claim 11 of the present invention is the mobile communication system according to any one of claims 7 to 9; wherein, when the master-slave relationship between the mobile router and a mobile node is released, the first local location manager confirms whether there is any difference between the location information on the mobile router and location information on the mobile node, and, if there is any difference, corrects the location information on the mobile router and deletes registration of the master-slave relationship. Thereby, even if location registration is not correctly performed by a mobile router, which performs an LU of mobile nodes existing in the space of a moving body on behalf of the mobile nodes, due to the communication condition or a failure, it can be dealt with.

DETAILED DESCRIPTION OF THE PREFERRED EMBODIMENTS

Description will be now made on embodiments of the present invention with reference to drawings. On each of the figures to be referred to in the description below, the portions corresponding to those on the other figures are indicated by the same symbols.

This system provides a procedure for transferring information on a master-slave relationship between an MR and MN's, from an old LLM associated with an area to move from, to a new LLM associated with an area to move to, and a procedure for updating a table within an HLM which stores information on the LLM for the area in which the MN's and the MR exist. Description will be also made on variation examples after describing the configuration and the operation of this system.

A: SYSTEM CONFIGURATION

Figure 1:
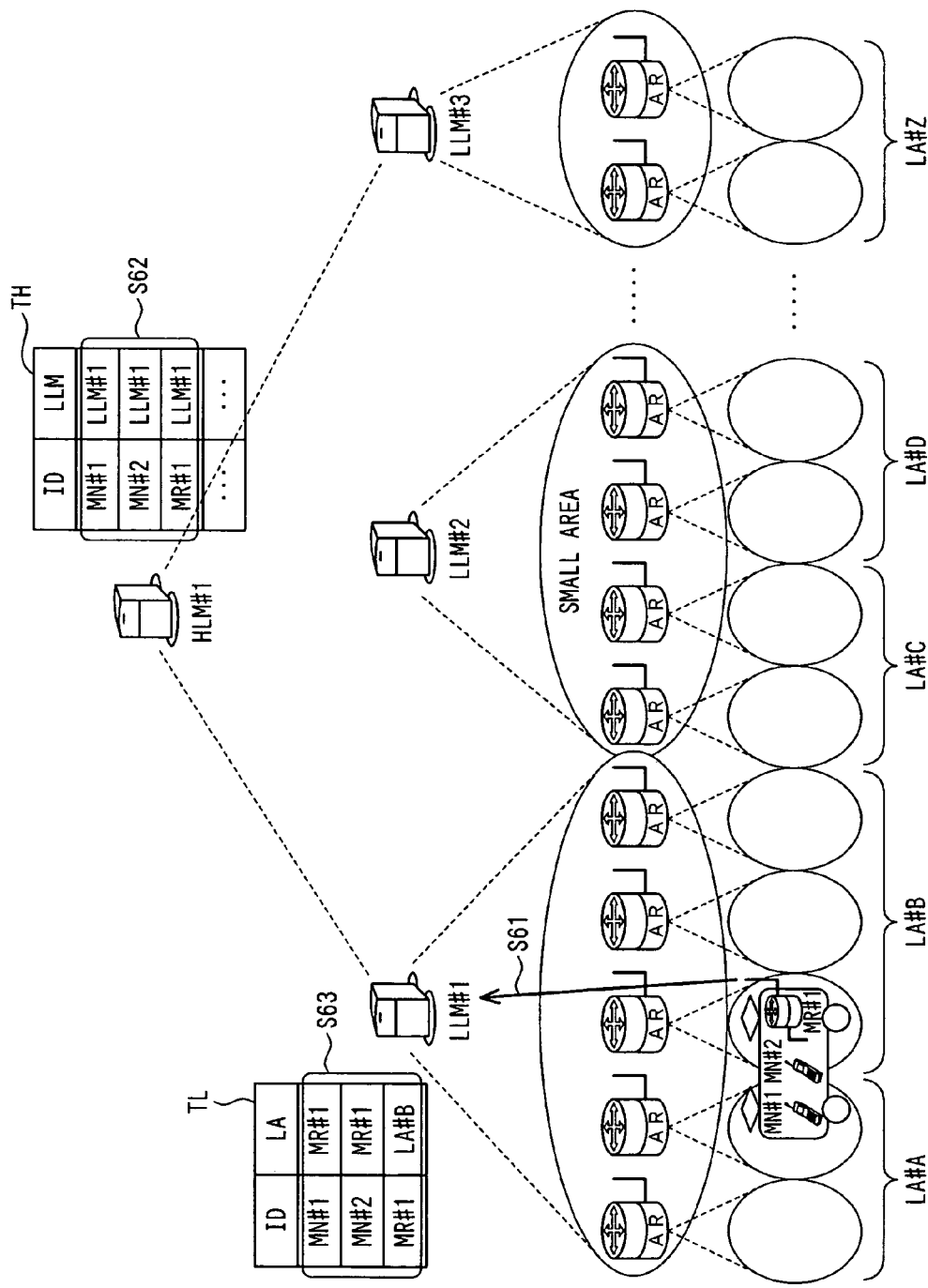
FIG. 1 is a block diagram showing a configuration of a mobile communication system according to the present invention.

As shown in FIG. 1, this system is configured to include a mobile router MR#1 representing an LU of MN's existing in the space of a moving body; mobile nodes MN#1 and MN#2, which do not perform an LU when they exist in the same space as the mobile router MR#1; a home location manager HLM#1 storing LLM information, information on the LLM for the area in which these mobile nodes and the mobile router MR#1 exist; local location managers LLM#1, LLM#2 and LLM#3 storing LA information on the MN's and the MR or master-slave relationship information indicating a master-slave relationship between the mobile router and the mobile nodes; and AR's for signaling ArI's to the mobile nodes and the mobile router and retaining correspondence relationships between the ArI's and an ArA's managed as an LA's within the network.

A small area is formed for each of the local location managers LLM#1, LLM#2 and LLM#3. Each area includes one or more AR's. Each of location areas LA#A, LA#B, LA# C, LA#D, . . . , LA#Z is a set of multiple areas each of which corresponds to each of AR's. The LLM#1 and the HLM#1 are provided with tables TL and TH, respectively, with which location information are registered. The LLM#2 and the LLM#3 are assumed to be similarly provided with a table.

Though not specifically shown in the figure, there are generally provided a router or a switch for transferring a signal between AR and an LLM, between LLM and HLM and between LLM and LLM.

In FIG. 1, the MR#1 notifying the nearest LLM#1 of a location update request on behalf of the MN#1 and the MN#2 (S61). In this case, as shown in the figure, it has been registered with the HLM#1 that a mobile node with an identification (ID) "MN#1", a mobile node with an identification (ID) "MN#2" and a mobile router with an identification (ID) "MR#1" exist in the area under the management of "LLM#1" (S62).

Information on a master-slave relationship between the MR#1 and the MN#1/MN#2 has been registered with the LLM#1. In this case, as shown in the figure, it is registered with the LLM#1 that a mobile node with an identification (ID) "MN#1" and a mobile node with an identification (ID) "MN#2" are dependent on a mobile router "MR#2" (S63).

The area address in the area where the mobile router MR#1 exists has also been registered with the LLM#1. In the figure, since the MR#1 exists in an area belonging to the LA#B, the area address LA of the MR#1 has been registered as "LA#B". Even if the MR#1 subsequently moves, the contents registered with the LLM#1 is not updated as long as the MR#1 exists within areas belonging to the LA#B.

Figure 2:
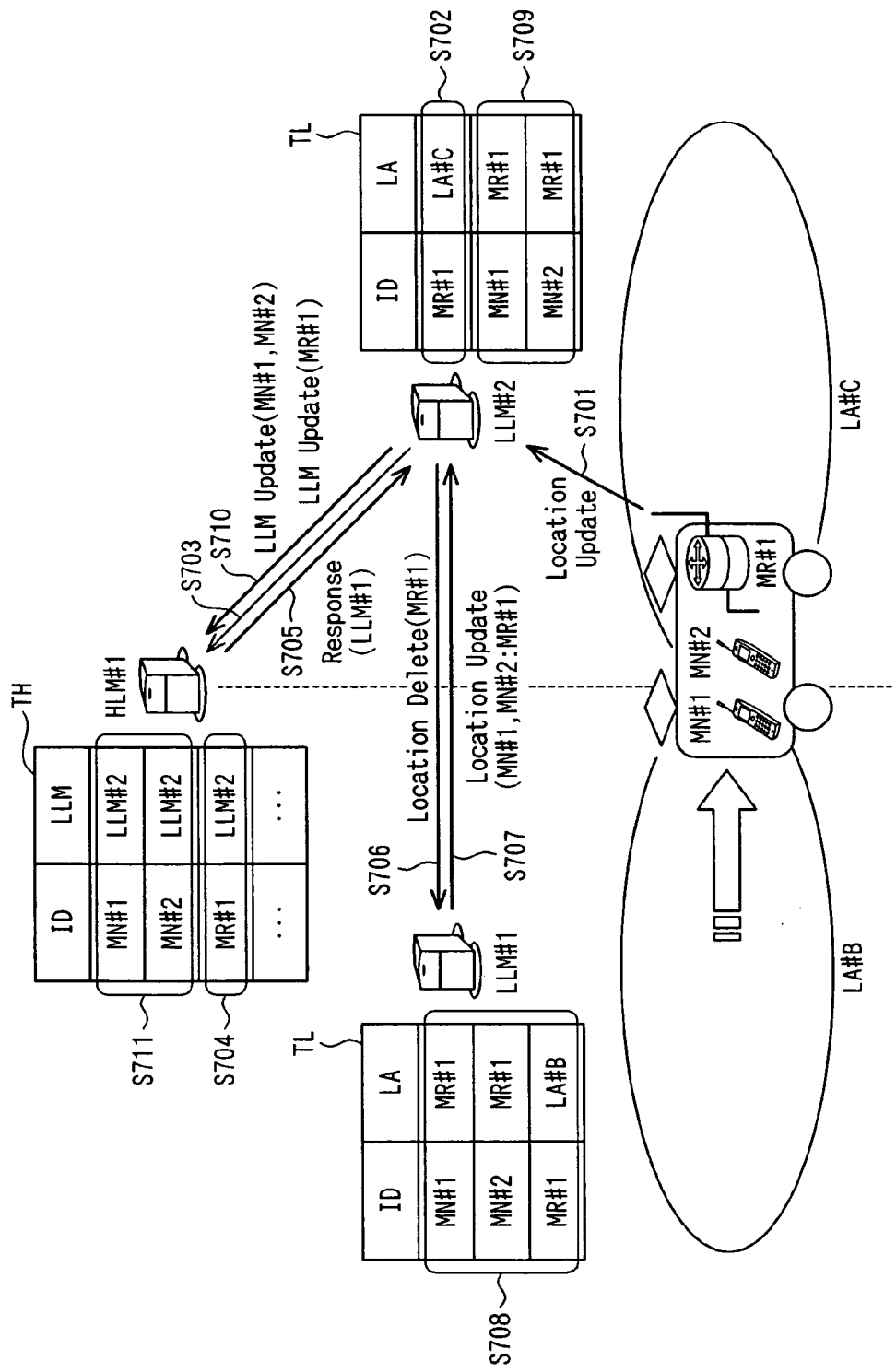
FIG. 2 is a sequence diagram showing the operation of a mobile communication system according to a first embodiment of the present invention.

If the MR#1 further moves and goes over to an area belonging to the LA#C from an area belonging to the LA#B, that is, the MR#1 moves between areas managed by different LLM's, then a registration update process is performed as shown in FIG. 2.

In the figure, when the MR#1 moves from the area LA#B to the area LA#C, a location update request is notified to the location manager LLM#2 associated with the area LA#C to which the MR#1 has moved (S701). Then, the area address LA of the mobile router with an identification (ID) "MR#1" is registered with the LLM#2 as "LA#C" (S702).

It is then notified to the HLM#1 that the contents registered with the LLM#2 has been updated (S703). In response to this, it is registered with the HLM#1 that a mobile router with an identification (ID) "MR#1" exists in an area under the management of the "LLM#2" (S704). After the registration, the HLM#1 returns a response including "LLM#1" associated with the area from which the MR#1 has moved (S705). Receiving this response, the location manager LLM#2 notifies a direction to delete the contents registered for the MR#1 to the location manager LLM#1 (S706).

Receiving this notification, the location manager LLM#1 notifies the location manager LLM#2 of the identifications (ID's) and the LA's of the MN#1 and the MN#2 which are dependent on the MR#1 (S707). The location manager LLM#1 then deletes the registered contents (S708). It is registered with the location manager LLM#2 that the LA's of both identifications (ID's) "MN#1" and "MN#2" are "MR#1", that is, the mobile router MR#1 and the mobile nodes MN#1 and MN#2 are in a master-slave relation (S709). It is then notified to the HLM#1 that the contents registered with the LLM#2 have been updated (S710). In response to this, it is registered with the HLM#1 that mobile nodes with identifications (ID's) "MN#1" and "MN#2" exist in an area under the management of "LLM#2" (S711).

B: OPERATION OF THE SYSTEM

First Embodiment

Description will be made below on the operation of registering a master-slave relationship, the operation performed when the movement is between areas managed by the same LLM, the operation performed when the movement is between areas managed by different LLM's, the operation of receiving an inquiry and the operation of releasing a master-slave relationship separately in each section.

(Operation of Registering a Master-Slave Relationship)

Figure 3:
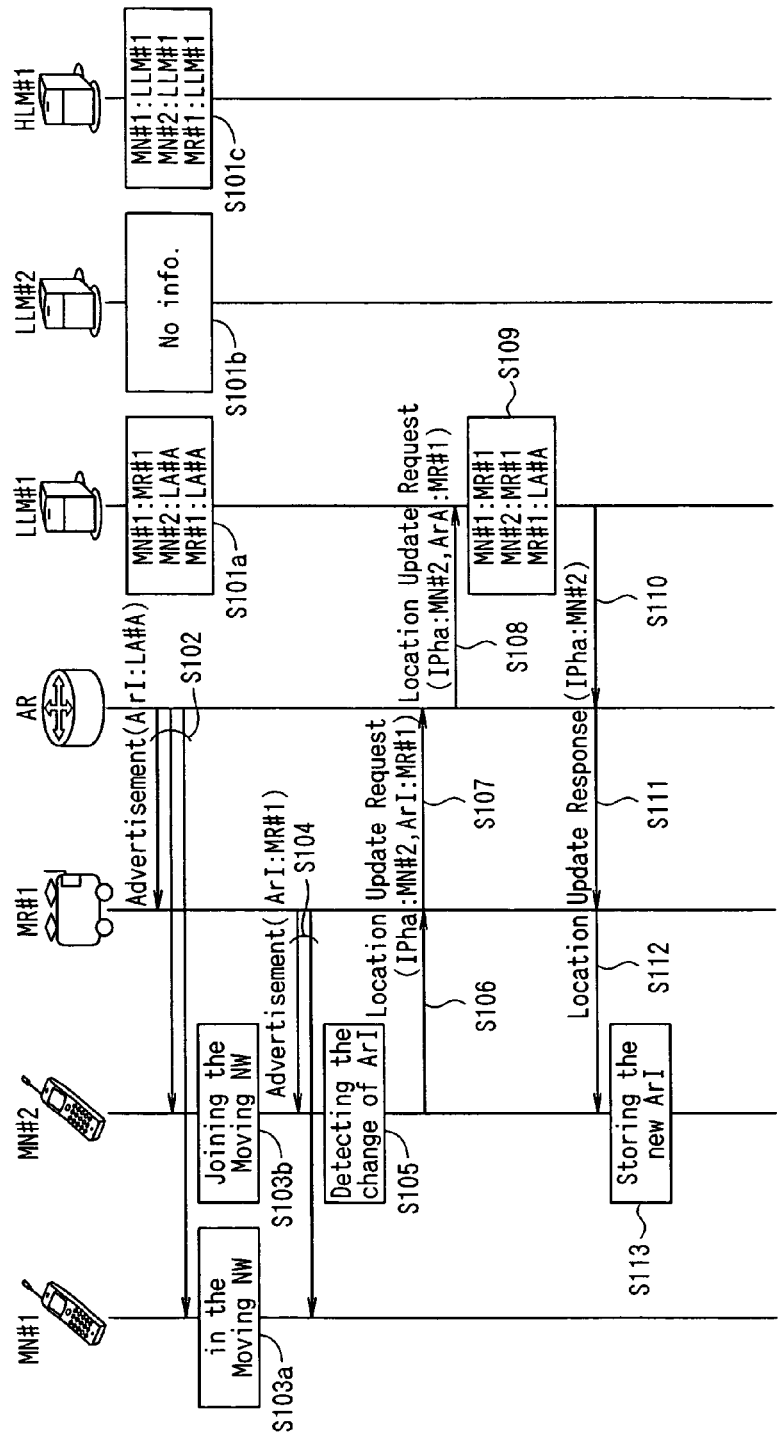
FIG. 3 is a sequence diagram showing the operation of registering a master-slave relationship between a mobile router and a mobile node in the mobile communication system according to the first embodiment of the present invention.

FIG. 3 is a sequence diagram showing the registration operation to cause the mobile node MN#2 to be dependent on the mobile router MR#1, that is, the operation of registering a master-slave relationship. The figure shows the operations performed by the mobile nodes MN#1 and MN#2, the mobile router MR#1, an access router AR, the LLM#1, the LLM#2 and the HLM#1.

In the figure, the mobile node MN#1 is already in a moving body and dependent on the mobile router MR#1. The MN#2 exists in the LA#A, and the MR#1 also exists in the LA#A. Accordingly, it has been registered with the LLM#1 that the LA of the identification (ID) "MN#1" is "MR#1", the LA of the identification (ID) "MN#2" is "LA#A", and the LA of the identification (ID) "MR#1" is "LA#A" (S101a). The registered contents indicate that the mobile router MR#1 is in a master-slave relationship with the mobile node MN#1, but not with the MN#2.

There is no information registered with the LLM#2 (S101b). It has been registered with the HLM#1 that the LLM information for all the identifications (ID's) "MN#1", "MN#2" and "MR#1" is "LLM#1" (S101c).

To the mobile nodes MN#1 and MN#2 and the mobile router MR#1, there has been sent an advertisement indicating that the ArI is "LA#A" by the access router AR (S102).

In this situation, the mobile node MN#1 is already in the moving body (S103a). In contrast, the mobile node MN#2 is a node which has just got on the moving body (S103b).

In the moving body, advertisement indicating that the ArI is "MR#1" is sent by the mobile router MR#1 to all the mobile nodes with in the moving network (S104). In this example, the mobile nodes MN#1 and MN#2 receive the advertisement. Receiving the advertisement, the mobile node MN#2 detects that it has got on a moving body because the ArI has changed (S105).

The mobile node MN#2 then sends a location update request to the mobile router MR#1 (S106). The location update request includes its own identification IPha ("MR#2") and an ArI corresponding to "MR#1". The mobile router MR#1 sends the location update request directly to the access router AR (S107). Receiving this request, the access router AR derives and sets an ArA from the ArI information and sends the location update request to the nearest LLM#1 (S108).

Receiving this location update request from the mobile node MN#2, the LLM#1 registers the master-slave relationship between the mobile router MR#1 and the MN#2 (S109). Accordingly, in the LLM#1, the LA of the identification (ID) "MN#2" is updated from "LA#A" to "MR#1".

The LLM#1 then returns a response to the MN#2 via the access router AR and the mobile router MR#1 (S110, S111 and S112). Accordingly, the new ArI is stored in the mobile node MN#2 (S113).

(Operation Performed in the Case of Moving Within Areas Managed by the Same LLM)

Figure 4:
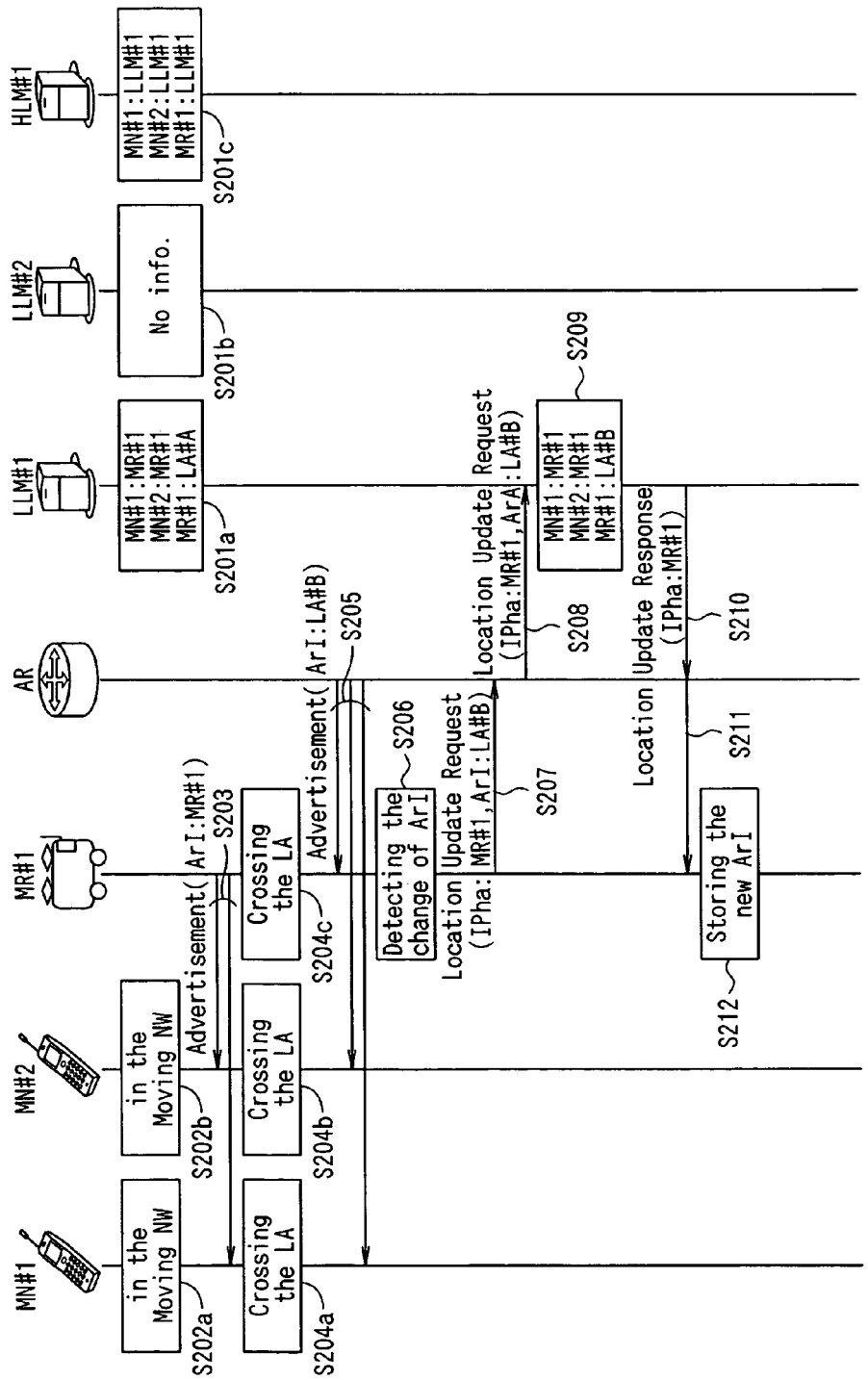
FIG. 4 is a sequence diagram showing the operation performed when mobile nodes move together with a mobile router within areas managed by the same LLM in the mobile communication system according to the first embodiment of the present invention.

FIG. 4 is a sequence showing the operation performed when the mobile nodes MN#1 and MN#2 move into the LA#B in dependence on the mobile router MR#1. The figure shows the operations performed by the mobile nodes MN#1 and MN#2, the mobile router MR#1, the access router AR, the LLM#1, the LLM#2 and the HLM#1.

In the figure, it has been registered with the LLM#1 that the LA's of both identifications (ID's) "MN#1" and "MN#2" are "MR#1" and that the LA of the identification (ID) "MR#1" is "LA#A" (S201a). The registered contents show that the mobile router MR#1 is in a master-slave relationship with the mobile nodes MN#1 and MN#2.

There is no information registered with the LLM#2 (S201b). It has been registered with the HLM#1 that the LLM information of all the identifications (ID's) "MN#1", "MN#2" and "MR#1" is "LLM#1" (S201c).

The mobile nodes MN#1 and MN#2 are both already in the moving body (S202a and S202b). In the moving body, an advertisement indicating that the ArI is "MR#1" is sent by the mobile router MR#1 to all the mobile nodes within the moving network (S203). In this example, the mobile nodes MN#1 and MN#2 receive the advertisement.

In this situation, the mobile nodes MN#1 and MN#2 and the mobile router MR#1 move between LAs managed by the same LLM (not between areas managed by different LLM's) (S204a, S204b and S204c), then the mobile nodes MN#1 and MN#2 and the mobile router MR#1 receive advertisement indicating that the ArI is "LA#B", from the access router AR (S205). Accordingly, the mobile router MR#1 detects that the ArI has changed (S206). In this case, the MN#1 and the MN#2, which can receive the advertisement from the MR#1, ignore the advertisement from the access router AR.

The mobile router MR#1, representing the group including the mobile nodes MN#1 and MN#2, sends a location update request for updating its own location information to the nearest LLM#1 to the access router AR (S207). This location update request includes the mobile router's own identification IPha ("MR#1") and the ArI corresponding to "LA#B". Receiving this request, the access router AR derives and sets an ArA (LA#B, in this case) from the ArI information and sends the location update request to the LLM#1 (S208).

Receiving this location update request, the LLM#1 updates the LA of the mobile router MR#1 with "LA#B" (S209). After the registration, the LLM#1 returns a location update response to the access router AR (S210). Receiving this response, the access router AR returns the location update response to the mobile router MR#1 (S211). Receiving this location update response, the mobile router MR#1 stores the new ArI (S212).

(Operation Performed in the Case of Moving Between Areas Managed by Different LLM's)

Figure 5:
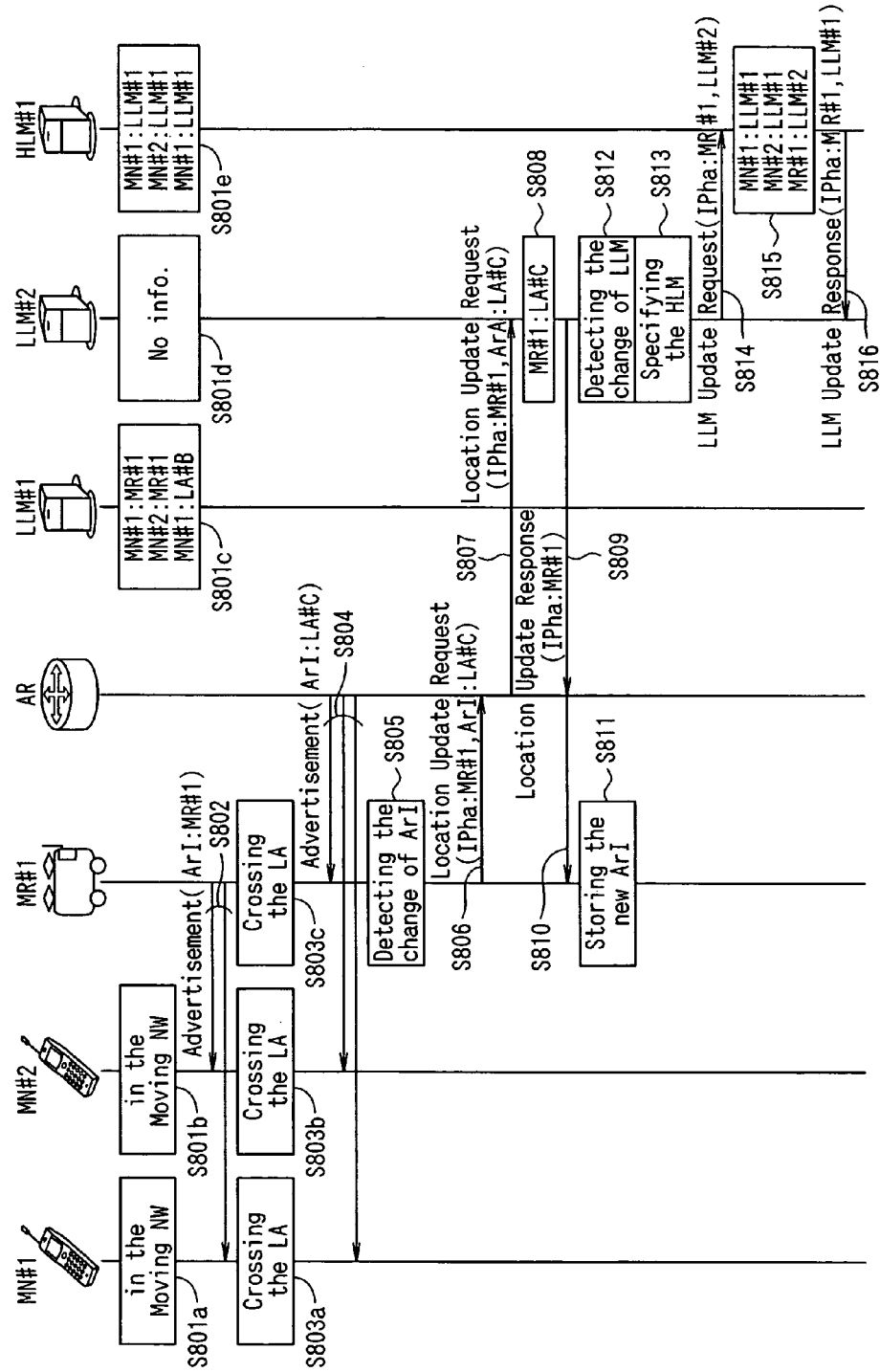
FIG. 5 is a sequence diagram showing the operation performed when mobile nodes move together with a mobile router between areas managed by two different LLM's in the mobile communication system according to the first embodiment of the present invention.
Figure 6:
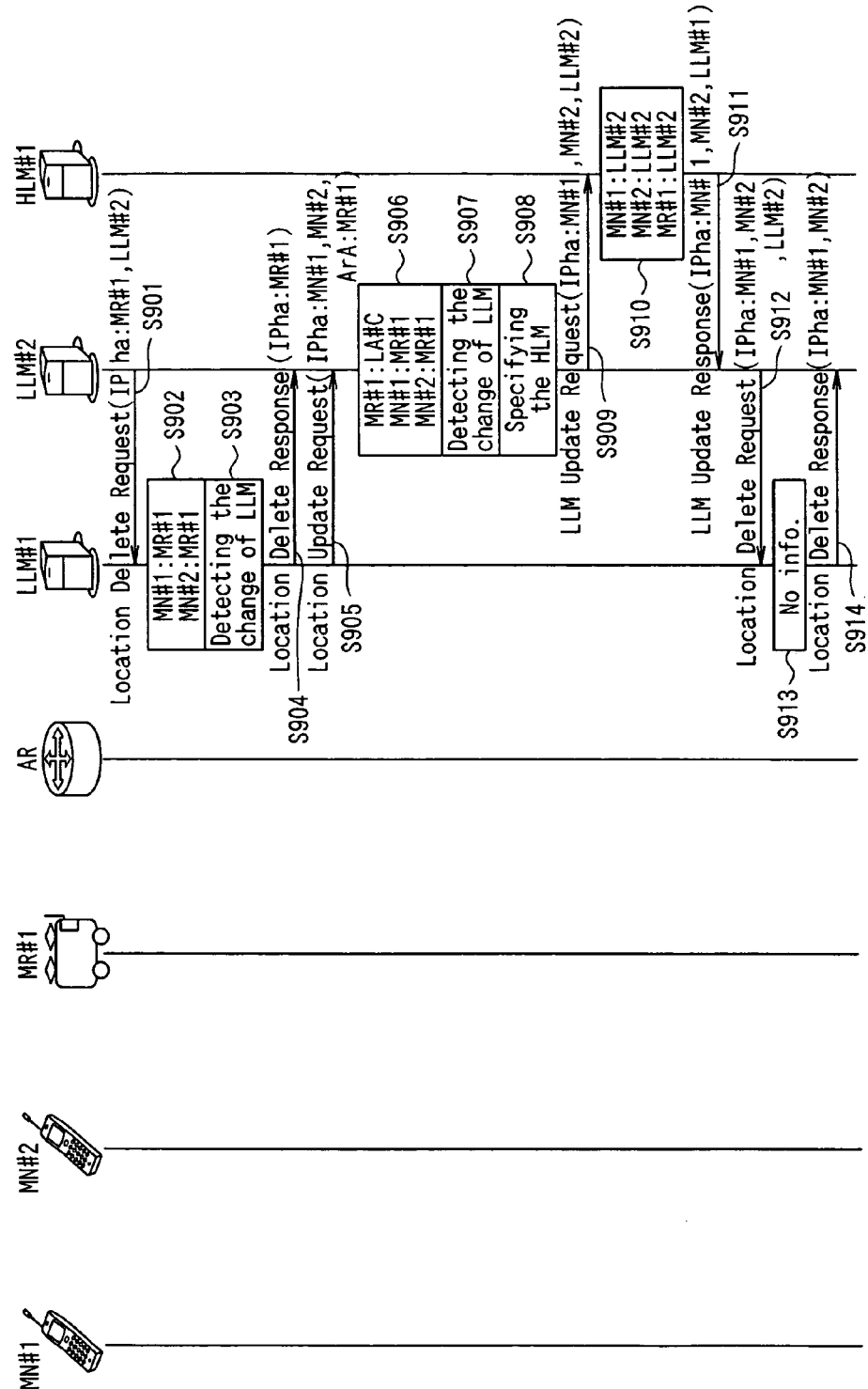
FIG. 6 is a sequence diagram showing the rest of the operation shown in FIG. 5.

FIGS. 5 and 6 are sequence diagrams showing the operation performed when the mobile nodes MN#1 and MN#2 move from the LA#B into the LA#C in dependence on the mobile router MR#1. The figures show the operations performed by the mobile nodes MN#1 and MN#2, the mobile router MR#1, the access router AR, the LLM#1, the LLM#2 and the HLM#1.

In FIG. 5, the mobile node MN#1 exists in the moving network (S801a), and the mobile node MN#2 also exists in the moving network (S801b).

It has been registered with the LLM#1 that the LA's of both identifications (ID's) "MN#1" and "MN#2" are "MR#1" and that the LA of the identification (ID) "MR#1" is "LA#B" (S801c). The registered contents show that the mobile router MR#1 is in a master-slave relationship with the mobile node MN#1 and MN#2.

There is no information registered with the LLM#2 (S801d). It has been registered with the HLM#1 that the LLM information of all of the identifications (ID's) "MN#1", "MN#2" and "MR#1" is "LLM#1" (S801e). An advertisement indicating that the ArI is "MR#1" is sent by the mobile router MR#1 to all the mobile nodes (the MN#1 and the MN#2) within the moving network (S802).

In this situation, when the mobile nodes MN#1 and MN#2 and the mobile router MR#1 move to the next LA managed by a different LLM (S803a, S803b and S803c), they receive advertisement indicating that the ArI is "LA#C" from the access router AR (S804). Accordingly, the mobile router MR#1 detects that the ArI has changed (S805). In this case, the MN#1 and the MN#2, which can receive the advertisement from the MR#1, ignore the advertisement from the access router AR.

The mobile router MR#1, representing the group including the mobile nodes MN#1 and MN#2, sends a location update request for updating its own location information to the nearest LLM#2 (S806). This location registration includes the mobile router's own identification IPha ("MR#1") and the ArI corresponding to "LA#C". Receiving this request, the access router AR derives and sets an ArA (LA#C, in this case) from the ArI information and sends the location update request to the LLM#2 (S807).

Receiving this location update request, the LLM#2 updates the LA of the mobile router MR#1 with "LA#C" (S808). After the registration, the LLM#2 returns a location update response to the access router AR (S809). Receiving this response, the access router AR returns the location update response to the mobile router MR#1 (S810). Receiving this location update response, the mobile router MR#1 stores the new ArI (S811).

When the registration is updated (S808), the LLM#2 recognizes it to be not update of the existing LA information but new registration. Therefore, the LLM#2 detects change of the LLM (S812) and identifies the HLM#1 managing the mobile router MR#1 using the identification (IPha), which is a specific address assigned to the mobile router MR#1 requesting registration, as a key (S813). The LLM#2 then sends an update request for updating LLM information on a location manager to manage the mobile router MR#1, to the identified HLM#1 (S814).

Receiving the update request, the HLM#1 changes the LLM information on the mobile router MR#1 from "LLM#1" to "LLM#2" (S815), and the HLM#1 returns the LLM information before update (LLM#1) to the LLM#2 as an update response (S816).

In FIG. 6, the LLM#2, by receiving the update response from the HLM#1, can identify the prior local location manager LLM#1. The LLM#2 then sends a deletion request to the LLM#1 in order to delete information on the mobile router MR#1 stored in the prior local location manager LLM#1 (S901).

Receiving this deletion request, the LLM#1 searches its table and deletes "LA#B" registered as information on the LA in which the mobile router MR#1 existed (S902). In this case, the LLM#1 also detects that the mobile nodes MN#1 and MN#2 are dependent on the mobile router MR#1 and that their LLM information has been changed (S903). The LLM#1, after returning a response to the effect that the information on the LA for the mobile router MR#1 has been deleted to the LLM#2 which has sent the deletion request (S904), sends a registration request for registering a master-slave relation between the mobile router MR#1 and the mobile nodes MN#1 and MN#2 to the LLM#2 (S905).

Receiving this registration request, the LLM#2 registers the mobile router MR#1 as the LA of the mobile nodes MN#1 and MN#2 (S906). That is, a master-slave relationship between the mobile router MR#1 and the mobile nodes MN#1 and MN#2 is registered.

The LLM#2 recognizes the update of the mobile nodes MN#1 and MN#2 to be new registration (S907), and identifies the HLM#1 managing each of the mobile nodes MN#1 and MN#2 using a key as the IPha specific to each of them (S908). The LLM#2 then sends a signal for updating LLM information on an LLM to manage the mobile nodes MN#1 and MN#2 to the identified HLM#1 (S909).

Receiving this update request, the HLM#1 updates the LLM information on both of the mobile nodes MN#1 and MN#2 from "LLM#1" to "LLM#2" (S910). After that, the HLM#1 returns the LLM information before update (LLM#1) to the LLM#2 as an update response (S911). Receiving this update response, the LLM#2 sends a signal to the prior local location manager LLM#1 to delete information on the mobile nodes MN#1 and MN#2 (S912). Receiving this deletion request, the LLM#1 searches its table and deletes the information on the mobile nodes MN#1 and MN#2. The "MR#1" which has been registered as the LA of the mobile nodes MN#1 and MN#2 is deleted then, and there is no registered information (S913). Finally, the LLM#1 returns a deletion response to the LLM#2 (S914), and the process ends.

(Operation of Receiving an Inquiry)

Figure 7:
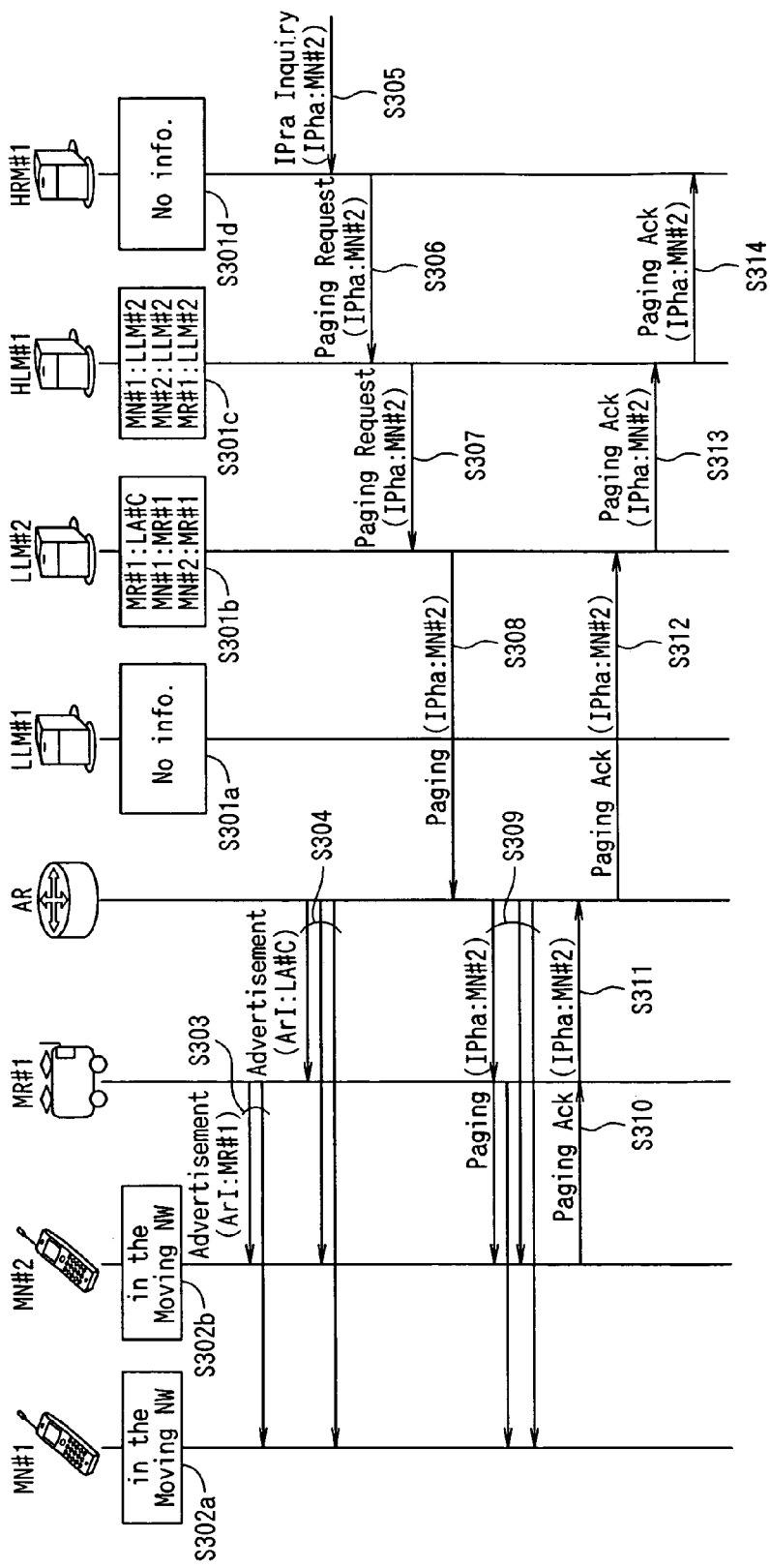
FIG. 7 is a sequence diagram showing the operation performed when a mobile node in a master-slave relationship with a mobile router receives inquiry in the mobile communication system according to the first embodiment of the present invention.

Description will be now made on the operation performed when a mobile node in a master-slave relationship with a mobile router receives a signal, with reference to FIG. 7. The figure is a sequence diagram showing the operation when the MN#2 dependent on the mobile router MR#1 receives an inquiry. The figure also shows a home routing manager (hereinafter referred to as HRM) HRM#1 for managing routing information on an MN in communication.

In the figure, there is no information registered with the LLM#1 (S301a). It is registered with the LLM#2 that the LA's of both identifications (ID's) "MN#1" and "MN#2" are "MR#1" and that the LA of the identification (ID) "MR#1" is "LA#C" (S301b). It is registered with the HLM#1 that the LLM's of all the identifications (ID's) "MN#1", "MN#2" and "MR#1" are "LLM#2" (S301c). There is no information registered with the HRM#1 (S301d).

The mobile node MN#1 exists in the moving network (S302a), and the mobile node MN#2 also exists in the moving network (S302b). Advertisement indicating that the ArI is "MR#1" is sent by the mobile router MR#1 to all the mobile nodes within the moving network (that is, the MN#1 and the MN#2) (S303). The mobile nodes MN#1 and MN#2 and the mobile router MR#1 receive an advertisement indicating that the ArI is "LA#C" from the AR (S304).

In this situation, when the mobile node MN#2 receives an inquiry (S305), the HRM#1 sends a paging request (S306). This paging request is inputted into all the access routers AR's responsible for the LA#C via the HLM#1 and the LLM#2 (S306, S307 and S308).

The access routers AR's perform simultaneous paging, and the mobile router MR#1, by receiving the simultaneous paging, also performs simultaneous paging for all the MN's within the moving network (S309).

When the mobile node MN#2 sends a response to the paging, the response is inputted in the HRM#1 via the mobile router MR#1, the access router AR, the LLM#2, the HLM#1 (S310, S311, S312, S313 and S314), and the AR for the area in which the MN#2 exists is identified.

(Operation of Releasing a Master-Slave Relationship)

Figure 8:
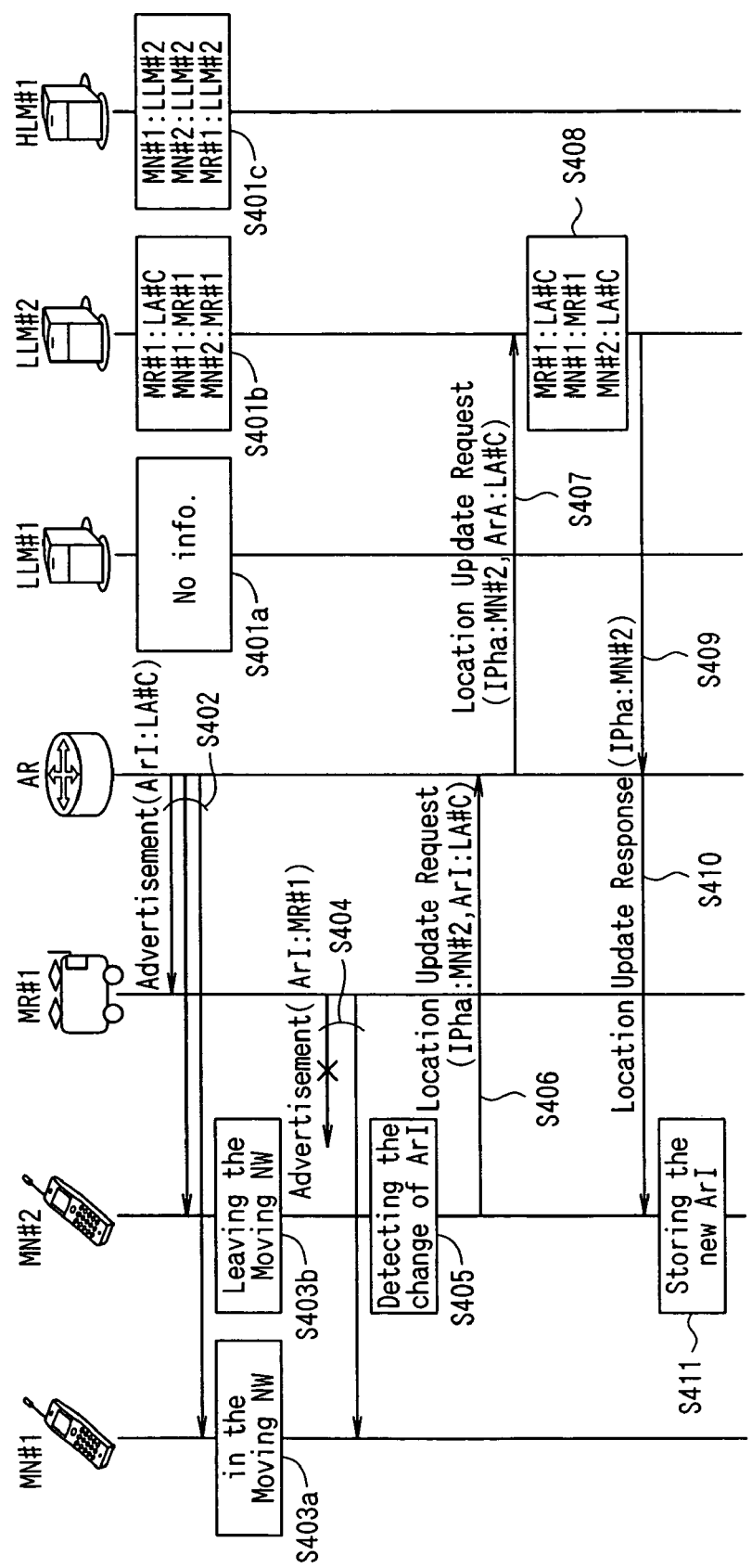
FIG. 8 is a sequence diagram showing the operation performed when a mobile node leaves a moving body in the mobile communication system according to the first embodiment of the present invention.

Description will be made on the operation performed when a mobile node leaves a moving body, with reference to FIG. 8. The figure shows the operation performed when it is recognized that the mobile node MN#2 has left a moving body because the ArI signaled by the mobile router MR#1 installed in the moving body cannot be received by the mobile node MN#2, and therefore, the master-slave relationship established between the mobile node MN#2 and the mobile router MR#1 is released in the nearest LLM#2 via the access router AR.

In the figure, there is no information registered with the LLM#1 (S401a). It is registered with the LLM#2 that the LA's of both identifications (ID's) "MN#1" and "MN#2" are "MR#1" and that the LA of the identification (ID) "MR#1" is "LA#C" (S401b). It is registered with the HLM#1 that the LLM of all the identifications (ID's) "MN#1", "MN#2" and "MR#1" are "LLM#2" (S401c).

The mobile nodes MN#1 and MN#2 and the mobile router MR#1 have received an advertisement indicating that the ArI is "LA#C", from the AR (S402).

In this situation, the mobile node MN#1 is still in the moving body (S403a). In contrast, the mobile node MN#2 is leaving the moving body (S403b).

In the moving body, an advertisement indicating that the ArI is "MR#1" is sent by the mobile router MR#1 to all the mobile nodes within the moving network (S404). In this example, since the advertisement is received by the mobile node MN#1 but is not received by the mobile node MN#2 which has left the moving body, it is detected that the mobile node MN#2 has left the moving body (S405).

The mobile node MN#2 then sends a location update request to the access router AR (S406). The location update request includes its own identification IPha ("MN#2") and the ArI corresponding to "LA#C". Receiving this request, the access router AR derives and sets an ArA from the ArI information and sends the location update request to the nearest LLM#2 (S407).

Receiving this location update request from the mobile node MN#2, the LLM#2 releases the master-slave relationship between the mobile router MR#1 and the MN#2, that is, registers "LA#C" as the LA of the MN#2 (S408).

The LLM#2 then returns a response to the MN#2 via the access router AR (S409 and S410). Accordingly, a new ArI is stored in the mobile node MN#2 (S411).

In short, in the first embodiment described above, the LLM is provided with the following functions. That is, the LLM is an apparatus for receiving registration of location information performed by a mobile router, which moves together with a group of mobile nodes in a master-slave relationship with the group, on behalf of the group. And, as shown in FIG. 9, it is configured to include: an update function L1 for updating location information registered with the LLM itself; a deletion request sending function L2 for sending a deletion request for deleting location information on the mobile router which has requested registration of location information, to a different LLM storing the lacation information; an update request sending function L3 for sending an update request for updating LLM information indicating a correspondence relationship of the mobile router and the mobile nodes with a local location manager; a signal sending/receiving portion L0 which form an interface for sending and receiving signals between portions in the LLM itself and portions in external devices such as an AR and an HLM.

The above-mentioned LLM information is registered with an HLM provided in association with multiple LLM's, and the HLM is identified based on an identification specific to a mobile router and mobile nodes. The TL in the figure is a table used for registering and retaining location information.

Figure 9:
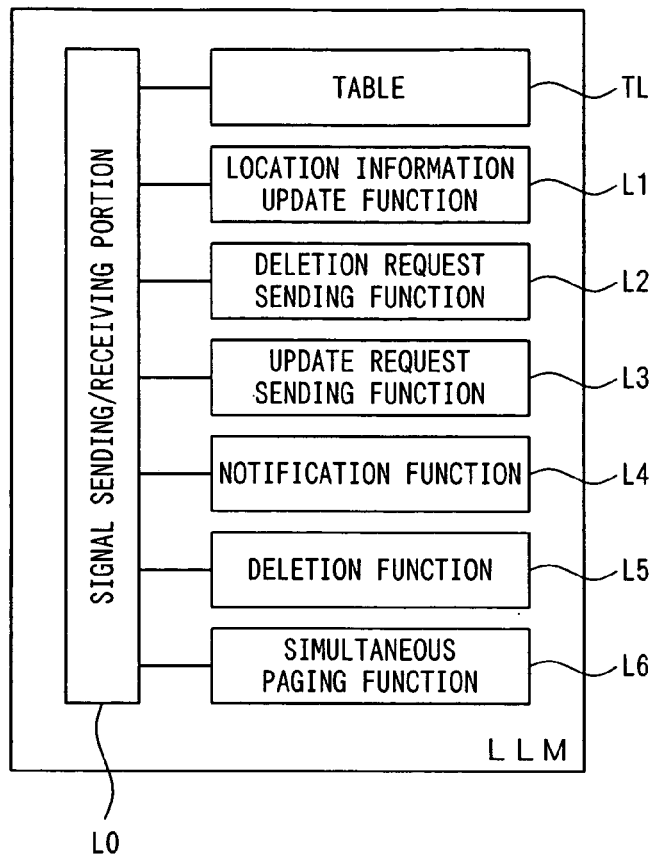
FIG. 9 shows a configuration example of a local location manager in the mobile communication system according to the first embodiment of the present invention.

As shown in FIG. 9, the prior LLM includes: a notification function L4 for, in response to receiving a deletion request for deleting location information which is destined to a different LLM, notifying the different LLM of the registered contents for a mobile node, which is in a master-slave relationship with a mobile router registered with the LLM itself; a deletion function L5 for deleting registered contents of location information and information indicating the master-slave relationship, on the mobile router registered with the LLM itself; and a simultaneous paging function L6 for performing simultaneous paging.

Figure 10:
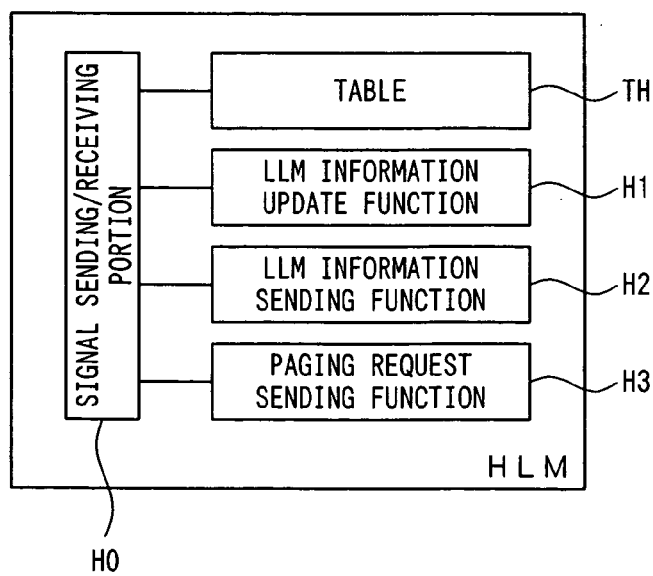
FIG. 10 shows a configuration example of a home location manager in the mobile communication system according to the first embodiment of the present invention.

The HLM is an apparatus for managing LLM information indicating a correspondence relationship of mobile nodes and a mobile router with a local location manager with which their location information is registered, and as shown in FIG. 10, it is configured to include: an LLM information updating function H1 for, in response to receiving an update request for updating LLM information from an LLM associated with the HLM itself, updating the LLM information registered with the HLM itself; an LLM information sending function H2 for sending registered contents before the update by the LLM information updating function H1, to the LLM which has sent the update request; a paging request sending function H3 for sending a paging request to request simultaneous paging to LLM's; and a signal sending/receiving portion H0 forming an interface for sending/receiving signals between portions in external apparatuses such as an LLM and portions in the HLM itself. The TH in the figure is a table used for registering and retaining LLM information.

By configuring a mobile communication system with such apparatuses, each mobile node and mobile router can send an LU to an LLM nearest to the area in which it exists. Thereby, time required for location registration can be reduced, and it is possible to prevent pressure on wireless resources and temporary increase in communication traffic within a mobile network, which may be caused by concentration of LU signals when a group moves as in the case of a train described above.

Second Embodiment

Figure 11:
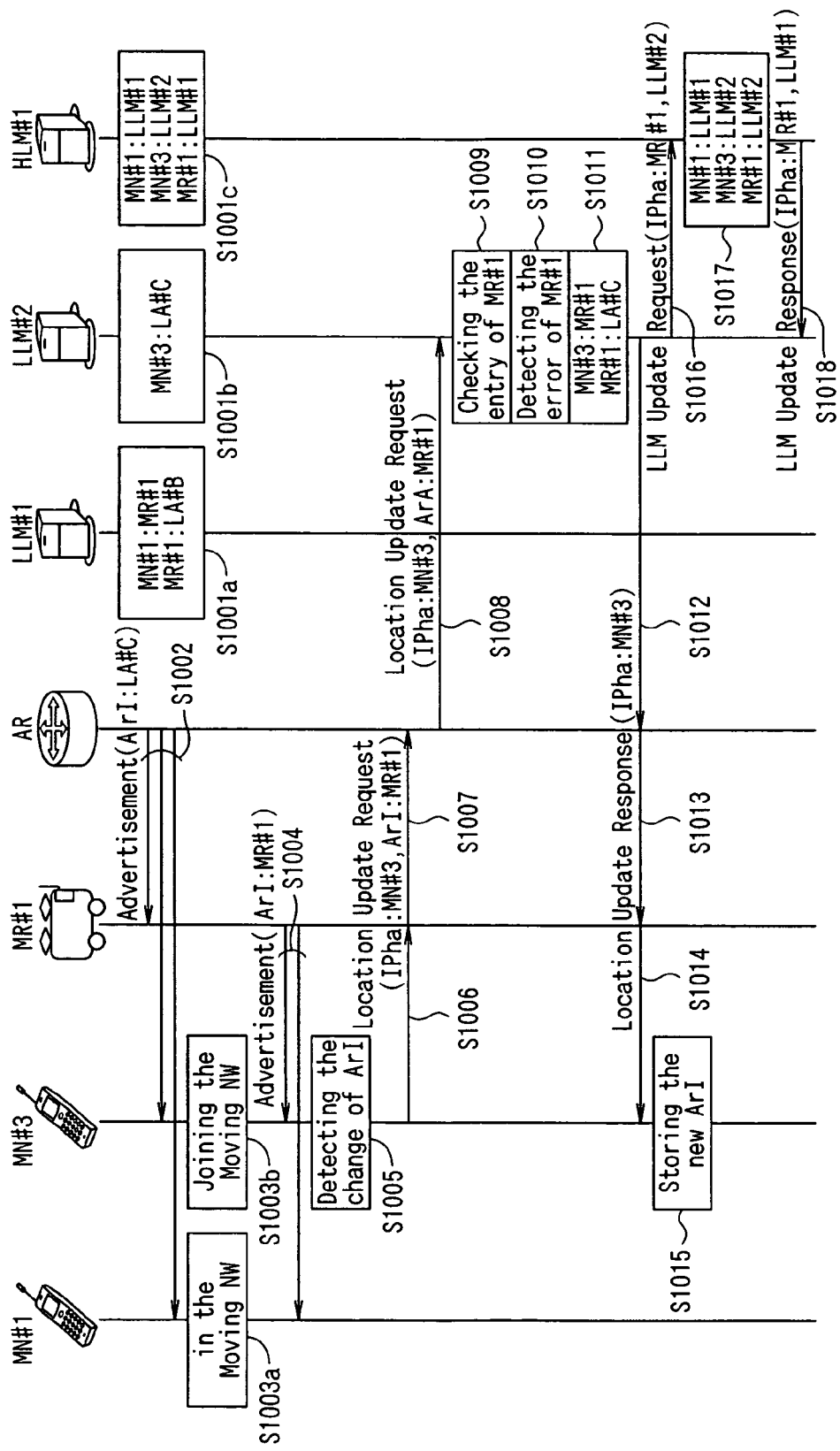
FIG. 11 is a sequence diagram showing the operation of a mobile communication system according to a second embodiment of the present invention.
Figure 12:
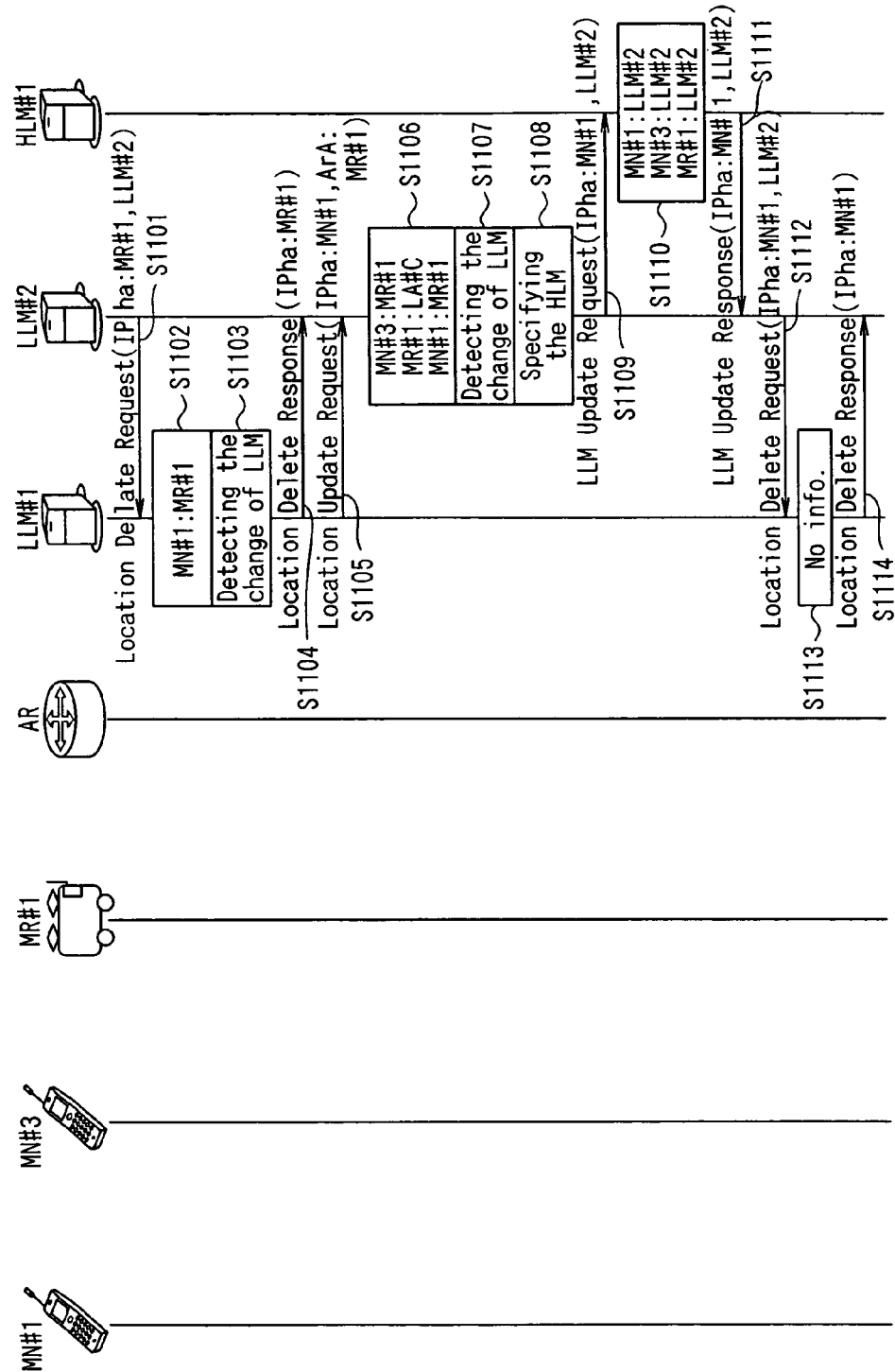
FIG. 12 is a sequence diagram showing the rest of the operation shown in FIG. 11.

FIGS. 11 and 12 are sequence diagrams showing a sequence of operations of a mobile communication system according to a second embodiment of the present invention. The figures show the operations performed by the mobile nodes MN#1 and MN#3, the mobile router MR#1, the access router AR, the LLM#1, the LLM#2 and the HLM#1. The configuration in the figures corresponds to that shown in FIG. 1.

In this embodiment, a mobile node, which has newly got on a moving body, recognizes that it has got on the moving body by receiving an area identification signaled by a mobile router installed in the moving body, and it registers a master-slave relationship with the mobile router with the nearest local location manager via the mobile router and an access router.

In FIG. 11, it has been registered with the LLM#1 that the LA of the identification (ID) "MN#1" is "MR#1" and the LA of the identification (ID) "MR#1" is "LA#B" (S1001a). It has been registered with the LLM#2 that the LA of the identification (ID) "MN#3" is "LA#C" (S1001b). It has been registered with the HLM#1 that the LA's of both identifications (ID's) "MN#1" and "MR#1" are "LLM#1" and that the LA of the identification (ID) "MR#3" is "LLM#2" (S1001c).

To the mobile nodes MN#1 and MN#3 and the mobile router MR#1, there has been sent an advertisement indicating that the ArI is "LA#C" by the access router AR (S1002).

In this situation, the mobile node MN#1 has been in the moving body (S1003a). The moving body is now in the LA#C, but it is assumed that location registration was not correctly performed by the mobile router MR#1 due to the communication condition or a failure of the LU signal sending function when the moving body moved from the LA#B into LA#C. The mobile node MN#3 is a node which has just got on the moving body (S1003b).

In the moving body, an advertisement indicating that the ArI is "MR#1" is sent by the mobile router MR#1 to all the mobile nodes within the moving network (S1004). In this example, the mobile nodes MN#1 and MN#3 receive the advertisement. Receiving the advertisement, the mobile node MN#3 can detect that it has got on the moving body because the ArI has changed (S1005).

The mobile node MN#3 then sends a location update request to the mobile router MR#1 (S1006). The location update request includes the its own identification IPha ("MR#3") and the ArI corresponding to "MR#1". The mobile router MR#1 sends the location update request directly to the access router AR (S1007). Receiving this request, the access router AR derives and sets an ArA from the ArI information and sends the location update request to the nearest LLM#2 (S1008).

Receiving the location update request from the mobile node MN#3, the LLM#2 compares LA information on the mobile router MR#1 and LA information on the MN#3 when registering a master-slave relationship between the mobile router MR#1 and the MN#3 (S1009). There should be registered LA#C as LA information on the mobile router MR#1 in the LLM#2, which has received a registration signal, and therefore the comparison result should show correspondence between the two pieces of information. However, in this example, the information on the MR#1 does not exist itself, so that the comparison result does not show correspondence, and an error is detected (S1010).

Then, the LLM#2 registers a master-slave relationship between the mobile router MR#1 and the mobile node MN#3, and "LA#C" for the MR#1 (S1011). That is, it is registered with the LLM#2 that the LA of the identification (ID) "MN#3" is "MR#1" and that the LA of the identification (ID) "MR#1" is "LA#C". The LLM#2 then returns a response to the MN#3 via the access router AR and the mobile router MR#1 (S1012, S1013 and S1014). Accordingly, a new ArI is stored in the mobile node MN#3 (S1015).

The LLM#2 then sends an update request for updating LLM information of an LLM to manage the mobile router MR#1, to the HLM#1 to manage the mobile router MR#1 (S1016). Receiving this update request, the HLM#1 changes the LLM information on the mobile router MR#1 from "LLM#1" to "LLM#2" (S1017). After that, the HLM#1 returns the LLM information before update (LLM#1) to the LLM#2 as an update response (S1018).

The subsequent operation sequence is similar to that shown in FIG. 6 for the embodiment 1 described above. That is, in FIG. 12, the LLM#2 can identify the prior local location manager LLM#1 by receiving the update response from the HLM#1. The LLM#2 then sends a request for deleting the LA for the mobile router MR#1 to the LLM#L in order to delete information on the mobile router MR#1 stored in the prior local location manager LLM#1 (S1101).

Receiving this deletion request, the LLM#1 searches its table and deletes "LA#B" registered as information on the LA in which the MR#1 existed (S1102). In this case, the LLM#1 also detects that the MN#1 is dependent on the mobile router MR#1 and that its LLM information has been changed (S1103). After returning a response to the effect that the information on the LA of the MR#1 has been deleted to the LLM#2, which has sent the deletion request (S1104), the LLM#1 sends a registration request for registering a master-slave relation between the mobile router MR#1 and the MN#1 to the LLM#2 (S1105).

Receiving this registration request, the LLM#2 registers the mobile router MR#1 as the LA of the MN#1 (S1106). That is, there is registered a master-slave relationship between the MR#1 and the MN#1.

The LLM#2 recognizes that the update of the MN#1 to be new registration (S1107), and identifies the HLM#1 managing the MN#1 using a key as the IPha specific to the MN#1 (S1108). The LLM#2 then sends a signal for updating LLM information on an LLM to manage the MN#1 to the identified HLM#1 (S1109).

Receiving this update request, the HLM#1 updates the LLM information on the MN#1 from "LLM#1" to "LLM#2" (S1110). After that, the HLM#1 returns the LLM information before update (LLM#1) to the LLM#2 as an update response (S1111). Receiving this update response, the LLM#2 sends a signal to the prior local location manager LLM#1 to delete the information on the MN#1 (S1112). Receiving this deletion request, the LLM#1 searches its table and deletes the information on the MN#1. The "MR#1" registered as the LA of the MN#1 is deleted then, and there is no registered information (S1113). Finally, the LLM#1 returns a deletion response to the LLM#2 (S1114), and the process ends.

Figure 13:
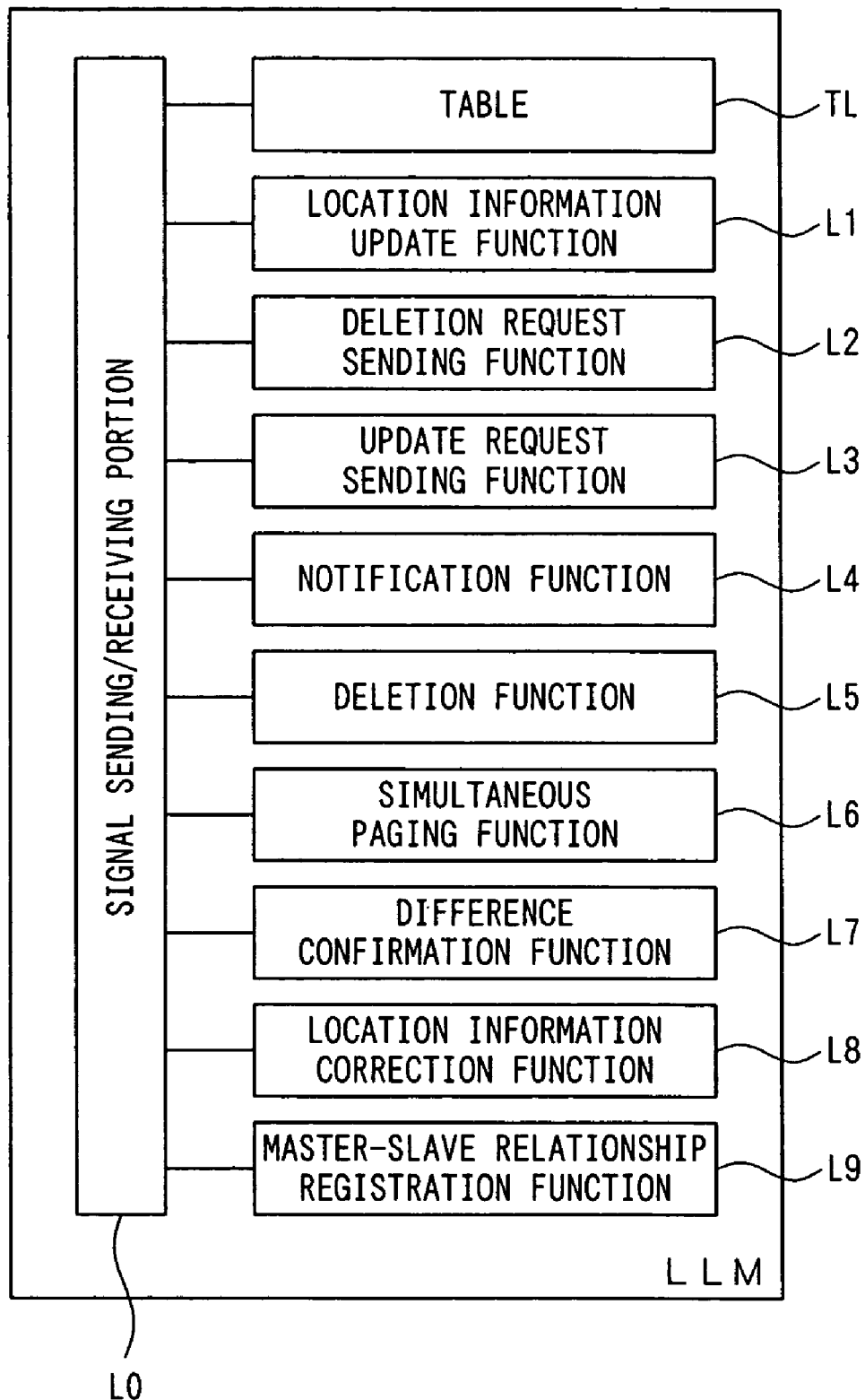
FIG. 13 shows a configuration example of a local location manager in the mobile communication system according to the second embodiment of the present invention.

In short, in the second embodiment described above, the LLM is provided with the following functions in addition to the functions shown in FIG. 9 (the first embodiment). That is, as shown in FIG. 13, the LLM is provided with a difference confirmation function L7 for confirming whether or not there is any difference between location information on a mobile router and location information on a mobile node when a master-slave relationship is newly established; a location information correction function L8 for correcting the location information on the mobile router when there is any difference between the location information; and a master-slave relationship registration function L9 for registering the master-slave relationship. Thereby, even if location registration is not correctly performed by a mobile router, which performs an LU of mobile nodes existing in the space of a moving body on behalf of the mobile nodes, due to the communication condition or a failure, it can be dealt with.

Third Embodiment

Figure 14:
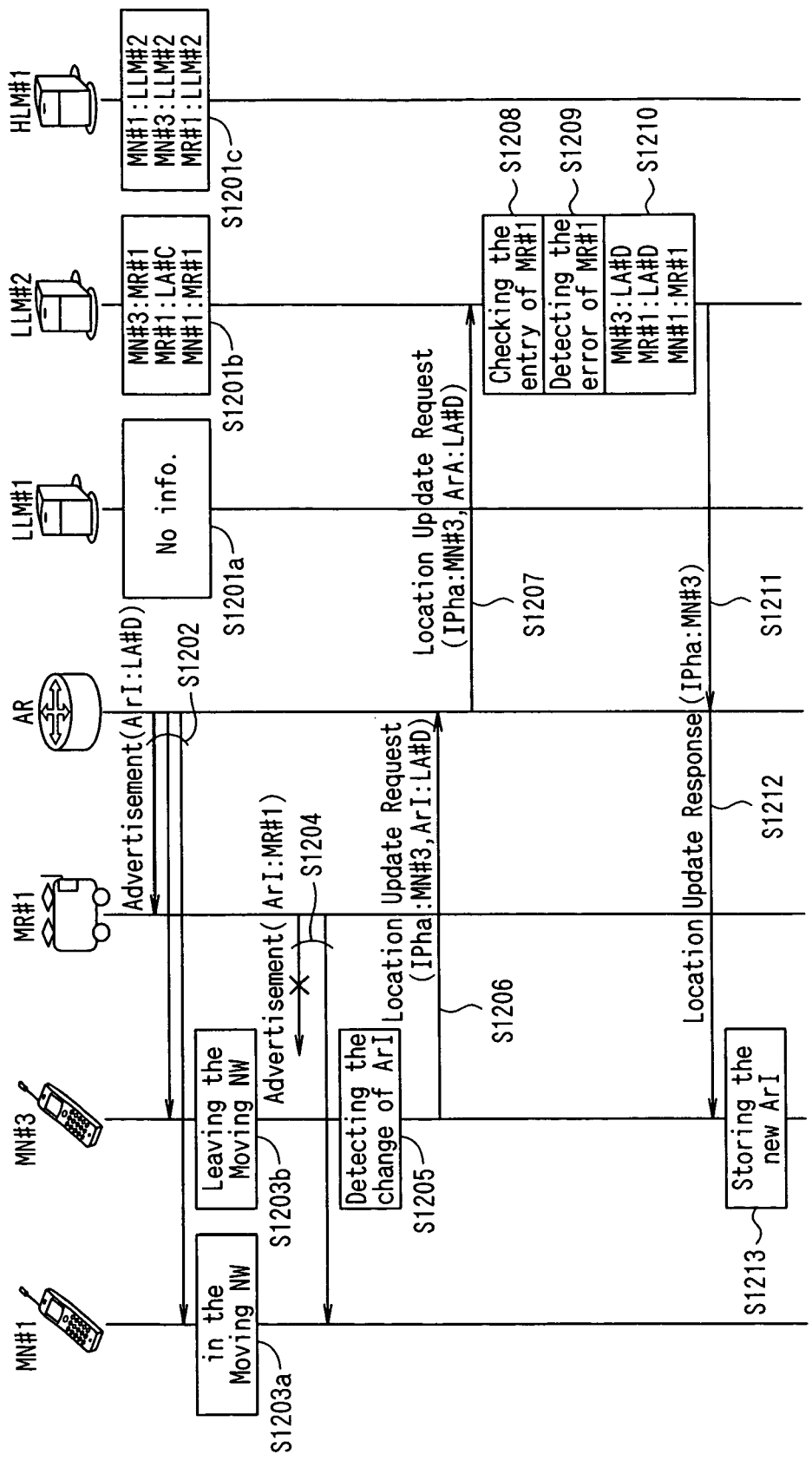
FIG. 14 is a sequence diagram showing the operation of a mobile communication system according to a third embodiment of the present invention.

FIG. 14 is a sequence diagram showing a sequence of operations of a mobile communication system according to a third embodiment of the present invention. The figure shows the operations performed by the mobile nodes MN#1 and MN#3, the mobile router MR#1, the access router AR, the LLM#1, the LLM#2 and the HLM#L. The configuration in the figures corresponds to that shown in FIG. 1.

In this embodiment, a mobile node, which has left a moving body, recognizes that it has left the moving body by not receiving an area identification signaled by a mobile router installed in the moving body, and it releases a master-slave relationship with the mobile router in the nearest local location manager via an access router.

In FIG. 14, there is no information registered with the LLM#1 (S1201a). It is registered with the LLM#2 that the LA's of both identifications (ID's) "MN#1" and "MN#3" are "MR#1" and that the LA of the identification (ID) "MR#1" is "LA#C" (S1201b). The registered contents show that the mobile router MR#1 is in a master-slave relationship with the mobile node MN#1 and MN#3.

It is registered with the HLM#1 that the LLM information of all the identifications (ID's) "MN#1", "MN#3" and "MR#1" is "LLM#2" (S1201c). To the mobile nodes MN#1 and MN#3 and the mobile router MR#1, there has been sent an advertisement indicating that the ArI is "LA#D" by the access router AR (S1202).

In this situation, the mobile node MN#1 has been in the moving body (S1203a). The moving body is now in the LA#D, but it is assumed that location registration was not correctly performed by the MR#1 due to the communication condition or a failure of the LU signal sending function when the moving body moved from the LA#C into LA#D. The mobile node MN#3 is a node which is leaving the moving body (S1203b).

In the moving body, an advertisement indicating that the ArI is "MR#1" sent by the mobile router MR#1 to all the mobile nodes within the moving network (S1204). In this example, since the advertisement is received by the mobile node MN#1 but is not received by the mobile node MN#3, which has left the moving body, it can be detected that the mobile node MN#3 has left the moving body (S1205).

The mobile node MN#3 then sends a location update request to the access router AR (S1206). The location update request includes its own identification IPha ("MN#3) and the ArI corresponding to "LA#D". Receiving this request, the access router AR derives and sets an ArA from the ArI information and sends the location update request to the nearest LLM#2 (S1207).

Receiving this location update request from the mobile node MN#3, the LLM#2 compares LA information on the mobile router MR#1 and LA information on the MN#3 when releasing the master-slave relationship between the mobile router MR#1 and the mobile node MN#3 (S1208). There should be registered LD#D as LA information on the mobile router MR#1 in the LLM#2, and therefore the comparison result should show correspondence between the two pieces of information. However, in this example, the LA information on the mobile router MR#1 is LA#C, and an error is detected (S1209).

Then, the LLM#2 releases the master-slave relationship between the mobile router MR#1 and the MN#3, and registers "LA#D" as an LA for the MR#1 (S1210). That is, it is registered with the LLM#2 that the LA's of the identifications (ID's) "MN#3" and the LA of "MR#1" is "LA#D" and that the LA of the identification (ID) "MN#1" is "MR#1".

The LLM#2 then returns a response to the MN#3 via the access router AR (S1211 and S1212). Accordingly, a new ArI is stored in the mobile node MN#3 (S1213).

Figure 15:
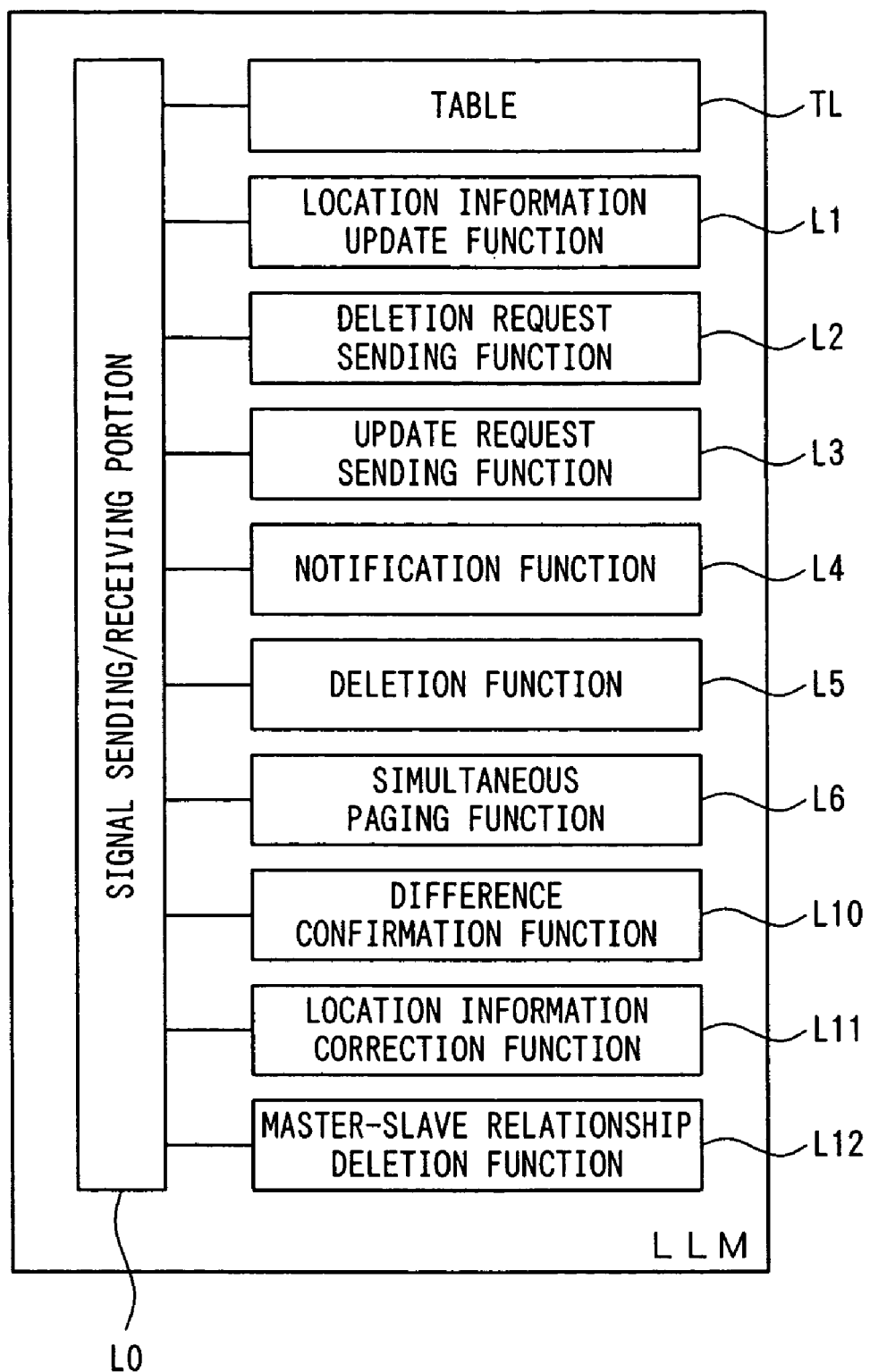
FIG. 15 shows a configuration example of a local location manager in the mobile communication system according to the third embodiment of the present invention.
Figure 16:
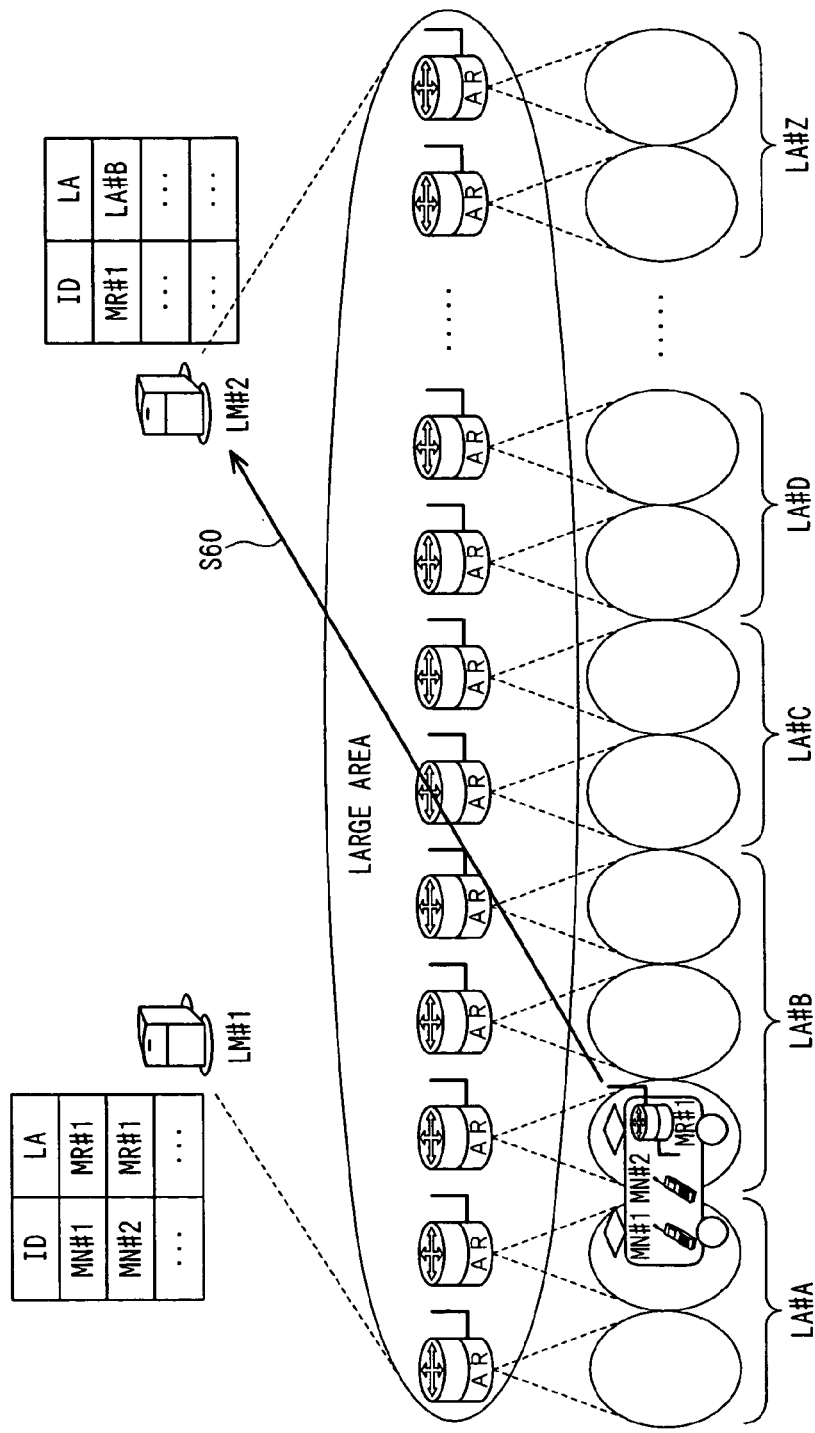
FIG. 16 shows a configuration of a prior-art mobile communication system.

In short, in the third embodiment described above, the LLM is provided with the following functions in addition to the functions shown in FIG. 9 (the first embodiment). That is, as shown in FIG. 15, the LLM is provided with a difference confirmation function L10 for confirming whether or not there is any difference between location information on a mobile router and location information on a mobile node when the master-slave relationship between the mobile router and the mobile node is released; a location information correction function L11 for correcting the location information on the mobile router when there is any difference between the location information; and a master-slave relationship deletion function L12 for deleting the master-slave relationship. Thereby, even if location registration is not correctly performed by a mobile router, which performs an LU of mobile nodes existing in the space of a moving body on behalf of the mobile nodes, due to the communication condition or a failure, it can be dealt with.

The difference confirmation function L7, the location information correction function L8 and the master-slave relationship registration function L9 shown in FIG. 13 (the second embodiment) may be added to the configuration of the third embodiment described above.

C: VARIATION EXAMPLES

The present invention is not limited to the embodiments described above, and the following variations may be included, for example.

(C-1) When the MR#1 installed in a moving body recognizes mobile nodes dependent on the MR#1 itself and sends not only its own identification (IPha) but also IPha's of the dependent mobile nodes when performing location update of itself, the LLM#2 detects LLM update for the MR#1 and all the mobile nodes dependent on the MR#1 at a time and identifies an HLM#1 to manage the MR#1 and each of the mobile nodes in the sequence shown in FIGS. 5 and 6. Subsequently, in the identified HLM#1, LLM information on the MR#1 and all the MN's dependent on the MR#1 is updated at a time.

The LLM#2 identifies the LLM#1 from the prior LLM information included in the update response from the HLM#1, and deletes the information for the MR#1 and all the MN's dependent on the MR#1 at a time.

(C-2) Sending of the location update response signal from the LLM#2 to the MR#1 in FIG. 5 may be performed after the operation sequence in FIG. 6 has completely ended.

(C-3) Though description has been made on a two-stage master-slave relationship, that is, on a mobile router, which is a master, and mobile nodes dependent on the mobile router in the above embodiments, the present invention may be applied to a multi-stage master-slave relationship, in which the above-mentioned master-slave relationship is repeated. For example, if there has been established a three-stage master-slave relationship such as MR#1 (master)—MR#11 (slave) (master)—MN#1 (slave), then not only the master-slave relationship between MR#1 and MR#11 but also the master-slave relationship between MR#11 and MN#1 is detected and transferred when transferring the relationship between the highest MR#1 and a mobile router or a mobile nodes dependent on the highest MR#1 from the LLM#1 to the LLM#2 in the sequence diagram shown in FIG. 6.

(C-4) Though description has been made on the case where transfer of a signal between an MN in a moving body and an AR is performed via an MR in the above embodiments, a signal may be sent and received directly between the MN and the AR not via the MR.

(C-5) In the above embodiments, the HLM#1 notifies the LLM#2 of the prior LLM information (LLM#1) so that the LLM#2 sends a request for deleting information on the MR#1 to the LLM#1. However, the HLM#1 may direct the LLM#1 to delete information on the MR#1 and to transfer information on the master-slave relationship between the MR#1 and the MN's to LLM#2.

As described above, according to the present invention, each mobile node and mobile router sends a location update request to a local location manager near to the area in which it exists. Thereby, time required for location registration can be reduced, and it is possible to prevent pressure on wireless resources and temporary increase in communication traffic within a mobile network, which may be caused by concentration of location update signals when a group moves as in the case of a train described above. And, even if location registration is not correctly performed by a mobile router, which performs a location update request on behalf of mobile nodes existing in the space of a moving body, due to the communication condition or a failure, it can be dealt with.

What is claimed is:

1. A local location manager, comprising:
 means for updating location information registered with the local location manager, wherein
  the location updating is in response to a location update request sent by a mobile router moving together with a group of mobile nodes in a master-slave relationship on behalf of the group,
  local location manager information is registered and stored in a home location manager provided in association with multiple local location managers, and indicates a correspondence relationship of the mobile router and the mobile nodes with the local location manager, and
  the local location manager is adapted to register location information of the mobile router and the group of mobile nodes when each mobile node sends a location update request to the local location manager nearest to an area where the group of mobile nodes exists so that a time required for location registration is reduced;
 means for sending a deletion request for deleting location information on the mobile router or the mobile nodes, which has requested registration of location information, to a different local location manager storing the location information on the mobile router and the mobile node; and
 means for sending an update request for updating local location manager information on the mobile router or the mobile node, to the home location manager storing the local location manager information on the mobile router or the mobile nodes;

wherein when the mobile router moves between areas managed by the different local location manager the mobile router sends a location request for updating its own location information to the nearest local location manager.

2. The local location manager according to claim 1; wherein the home location manager is identified based on identifications specific to the mobile router and the mobile nodes.

3. A local location manager, comprising:

means for, in response to receiving a deletion request for deleting location information on the mobile router from a different local location manager, deleting registered contents of location information on the mobile router with the local location manager itself and notifying the different location manager of registered contents for the mobile nodes in a master-slave relationship with the mobile router registered with the local location manager itself, wherein the location deletion is in response to a location update request sent by a mobile router moving together with a group of mobile nodes in a master-slave relationship on behalf of the group, local location manager information is registered and stored in a home location manager provided in association with multiple local location managers, and indicates a correspondence relationship of the mobile router and the mobile nodes with the local location manager, and the local location manager is adapted to register location information of the mobile router and the group of mobile nodes when each mobile node sends a location update request to the local location manager nearest to an area where the group of mobile nodes exists, so that time required for location registration is reduced; and means for, in response to receiving the deletion request for deleting information on the mobile nodes, deleting registered contents of location information and information indicating a master-slave relationship on the mobile router registered with the local location manager itself, wherein when the mobile router moves between areas managed by different local location manager and the mobile router sends a location request for updating its own location information to the nearest local location manager.

4. The local location manager according to any one of claims 1 to 3; wherein, when a master-slave relationship is newly generated between the mobile router and a mobile node, it is confirmed whether there is any difference between the location information on the mobile router and location information on the mobile node, and, if there is any difference, the location information on the mobile router is corrected and the master-slave relationship is registered.

5. The local location manager according to any one of claims 1 to 3; wherein, when the master-slave relationship between the mobile router and a mobile node is released, it is confirmed whether there is any difference between the location information on the mobile router and location information on the mobile node, and, if there is any difference, the location information on the mobile router is corrected and registration of the master-slave relationship is deleted.

6. A home location manager for managing local location manager information, comprising:

means for, in response to receiving an update request for updating the local location manager information on the mobile router or the mobile nodes from the local location manager in association with the home location manager itself, updating the local location manager information on the mobile router or the mobile nodes registered with the home location manager itself; and providing a response to the local location manager which has sent the update request to permit the local location manager to send a deletion request for deleting location information on the mobile router or the mobile nodes to a different local location manager storing location information on the mobile router or the mobile node; and means for sending registered contents of the local location manager information on the mobile router or the mobile nodes before update to the local location manager which has sent the update request, wherein the local location manager information managed by the home location manager is registered with the home location manager and provided in association with multiple local location managers, the local location manager information indicating a correspondence relationship of mobile nodes and a mobile router with a local location manager, the local location manager receiving a location update request sent by a mobile router moving together with a group of mobile nodes in a master-slave relationship on behalf of the group, and the local location manager being adapted to register location information of the mobile router and the group of mobile nodes when each mobile node sends a location update request to the local location manager nearest to the area where the group of mobile nodes exist, so that time required for location registration is reduced, and wherein when the mobile router moves between areas managed the different local location manager, the mobile router sends a location request for updating its own location information to the nearest local location manager.

7. A mobile communication system, comprising: a local location manager, the local location manager receiving a registration of location information from a mobile router moving together with a group of mobile nodes in a master-slave relationship on behalf of the group, wherein the local location manager comprises:

means for updating location information registered with the local location manager itself and means for sending an update request for updating local location manager information indicating a correspondence relationship of the mobile router and the mobile nodes with the local location manager; an a home location manager for managing local location manager information indicating a correspondence relationship of the mobile nodes and the mobile router with the local location manager, the home location manager comprising:

means for, in response to receiving an update request for updating the local location manager information from a local location manager in association with the home location manager itself, updating the local location manager information registered with the home location manager itself, and means for sending registered contents before update to the local location manager which has sent the update request, wherein the local location manager further comprises means for sending a deletion request for deleting location information on the mobile router which has requested registration of location information, to a different local location manager storing the location information on the mobile router.

8. Mobile communication system according to claim 7; wherein the mobile router is designated to send a location update request for updating its own location information to the nearest local location manager when the mobile router moves between areas managed by different local location managers.

9. Mobile communication system according to claim 7; wherein the local location manager information is registered with a home location manager provided in association with multiple local location managers, and a home location manager is identified based on identifications specific to the mobile router and the mobile nodes.

10. Mobile communication system according to claim 7, wherein, the different local location manager comprising means for, in response to receiving the deletion request for deleting location information from the local location manager, notifying the location manager of registered contents for the mobile nodes in a master-slave relationship with a mobile router registered with the different local location manager; and means for deleting registered contents of location information and information indicating a master-slave relationship on the mobile router registered with the different local location manager.

11. Mobile communication system according to claim 7; wherein, the local location manager is designated to confirm, when a master-slave relationship is newly generated between the mobile router and a mobile node, whether there is any difference between the location information on the mobile router and location information on the mobile node, and, if there is any difference, to correct the location information on the mobile router and to register the master-slave relationship.

12. Mobile communication system according to claim 7; wherein the local location manager is designated to confirm, when the master-slave relationship between the mobile router and a mobile node is released, whether there is any difference between the location information on the mobile router and location information on the mobile node, and, if there is any difference, to correct the location information on the mobile router and to delete the master-slave relationship.

13. The mobile communication system according to claim 9, the mobile communication system further comprising a second local location manager comprising: means for, in response to receiving the deletion request for deleting location information to a different local location manager, notifying the different location manager of registered contents for the mobile nodes in a master-slave relationship with a mobile router registered with the second local location manager itself; and means for deleting registered contents of location information and information indicating a master-slave relationship on the mobile router registered with the second local location manager itself.

14. The mobile communication system according to claim 9; wherein, when a master-slave relationship is newly generated between the mobile router and a mobile node, the first local location manager confirms whether there is any difference between the location information on the mobile router and location information on the mobile node, and, if there is any difference, corrects the location information on the mobile router and registers the master-slave relationship.

15. The mobile communication system according to claim 13;
wherein, when the master-slave relationship between the mobile router and a mobile node is released, the first local location manager confirms whether there is any difference between the location information on the mobile router and location information on the mobile node, and, if there is any difference, corrects the location information on the mobile router and deletes registration of the master-slave relationship.

\* \* \* \* \*